United States Patent
Tsukada et al.

(10) Patent No.: US 7,912,616 B2
(45) Date of Patent: Mar. 22, 2011

(54) GEAR SHIFTING CONTROL DEVICE FOR WORK MACHINE

(75) Inventors: Hidenobu Tsukada, Tsuchiura (JP);
Youichi Kowatari, Kasumigaura (JP);
Kazunori Nakamura, Tsuchiura (JP);
Masaki Yoshikawa, Kasama (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 405 days.

(21) Appl. No.: 11/909,339

(22) PCT Filed: Nov. 9, 2006

(86) PCT No.: PCT/JP2006/322355
§ 371 (c)(1),
(2), (4) Date: Sep. 21, 2007

(87) PCT Pub. No.: WO2007/074584
PCT Pub. Date: Jul. 5, 2007

(65) Prior Publication Data
US 2010/0004834 A1    Jan. 7, 2010

(30) Foreign Application Priority Data
Dec. 26, 2005 (JP) .................................. 2005-373086

(51) Int. Cl.
*G06F 19/00* (2006.01)
(52) U.S. Cl. ................. 701/59; 701/50; 701/51
(58) Field of Classification Search ............... 701/50–51, 701/59
See application file for complete search history.

(56) References Cited

U.S. PATENT DOCUMENTS

| | | | |
|---|---|---|---|
| 5,964,813 A | | 10/1999 | Ishii et al. |
| 6,086,509 A | * | 7/2000 | Johnson et al. .................. 477/97 |
| 6,487,485 B1 | * | 11/2002 | Henneken et al. ............. 701/56 |
| 7,778,757 B2 | * | 8/2010 | Brattberg ......................... 701/51 |
| 2005/0032606 A1 | | 2/2005 | Takagi |
| 2005/0187070 A1 | | 8/2005 | Takagi |
| 2009/0055062 A1 | * | 2/2009 | Tsukada et al. ................. 701/56 |

FOREIGN PATENT DOCUMENTS

| | | |
|---|---|---|
| JP | 6-12305 | 3/1994 |
| JP | 10-138780 | 5/1998 |
| JP | 2003-287119 | 10/2003 |
| JP | 2005-016674 | 1/2005 |
| JP | 2005-233371 | 9/2005 |

* cited by examiner

*Primary Examiner* — Yonel Beaulieu
(74) *Attorney, Agent, or Firm* — Mattingly & Malur, P.C.

(57) ABSTRACT

A work machine gear shifting control device is capable of readily identifying the cause of failure in learning the clutch hydraulic pressure for operating a transmission clutch. A transmission gear shifting control section 46 is provided for each of clutches 61-65, and performs a learning process in which each of a plurality of handling processes learns the clutch hydraulic pressure for each of the clutches 61-65 and determines the clutch hydraulic pressure characteristic values for operating the individual clutches. Further, the transmission gear shifting control section 46 performs a learning monitoring process in each of the plurality of handling processes to formulate an error judgment, which indicates whether learning has failed in each of the plurality of subprocesses, and displays the result of the judgment.

10 Claims, 19 Drawing Sheets

| Pax | Pa | Pb | Ta | Tb |
|---|---|---|---|---|
| .... | .... | .... | .... | .... |
| .... | .... | .... | .... | .... |
| .... | .... | .... | .... | .... |
| 30 | 28 | 110 | 28 | 9 |
| 31 | 30 | 110 | 28 | 9 |
| 32 | 32 | 110 | 30 | 9 |
| 33 | 32 | 110 | 30 | 9 |
| .... | .... | .... | .... | .... |
| .... | .... | .... | .... | .... |
| .... | .... | .... | .... | .... |

LEARNING CONTROL FLOWCHART 1

LEARNING CONTROL FLOWCHART 2

NORMAL SCREEN

WHEN TRNSMISSION OIL TEMPERATURE
IS OUTSIDE PREDETERMINED RANGE

MONITOR ALTERNATES BETWEEN SCREEN 2 AND SCREEN 3
(TRANSMISSION OIL TEMPERATURE SCREEN)
AT 1.5-SECOND INTERVALS

SCREEN 4

WHEN ENGINE ROTATION SPEED IS
OUTSIDE PREDETERMINED RANGE

SCREEN 5

MONITOR ALTERNATES BETWEEN SCREEN 4 AND SCREEN 5
(ENGINE ROTATION SPEED SCREEN)
AT 1.5-SECOND INTERVALS

SCREEN 6

LEARNING UNSUCCESSFUL, ABORTED,
KEY SWITCH TURNED OFF

SCREEN 7

LEARNING UNSUCCESSFUL, ABORTED,
ENGINE ROTATION SPEED OUTSIDE
PREDETERMINED RANGE

SCREEN 8

LEARNING UNSUCCESSFUL, ABORTED,
OIL TEMPERATURE OUTSIDE
PREDETERMINED RANGE

SCREEN 9

FIRST-GEAR CLUTCH LEARNING STEP 1

SCREEN 10

FIRST-GEAR CLUTCH LEARNING STEP 2

SCREEN 11

FIRST-GEAR CLUTCH LEARNING STEP 3

SCREEN 12

SECOND-GEAR CLUTCH LEARNING STEP 1

SCREEN 13

REVERSE CLUTCH LEARNING STEP 3

SCREEN 14

LEARNING SUCCESSFUL

SCREEN 15

LEARNING UNSUCCESSFUL, LEARNING
FAILURE IN FIRST-GEAR STEP 1-1

SCREEN 16

LEARNING UNSUCCESSFUL, LEARNING
FAILURE IN FIRST-GEAR STEP 1-2

SCREEN 17

LEARNING UNSUCCESSFUL, LEARNING
FAILURE IN FIRST-GEAR STEP 2-1

SCREEN 18

LEARNING UNSUCCESSFUL, LEARNING
FAILURE IN FIRST-GEAR STEP 2-2

SCREEN 19

LEARNING UNSUCCESSFUL, LEARNING
FAILURE IN FIRST-GEAR STEP 3

SCREEN 20

LEARNING UNSUCCESSFUL, LEARNING
FAILURE IN SECOND-GEAR STEP 1-1

400
GEAR SHIFTING CONTROL DEVICE FOR WORK MACHINE

TECHNICAL FIELD

The present invention relates to a gear shifting control device for a wheel loader or other work machine having a transmission for traveling, and more particularly to a gear shifting control device for a work machine that can determine a hydraulic pressure characteristic value for each of a plurality of clutches provided for the transmission through clutch hydraulic pressure learning, and engage each clutch under optimum conditions.

BACKGROUND ART

A work machine such as a wheel loader has a gear shifting control device that includes a torque converter and a transmission, and transmits the motive power of an engine to wheels through the torque converter and transmission for traveling purposes. The transmission has clutches for forward traveling, reverse traveling, first gear, second gear, third gear, and fourth gear. A solenoid valve is provided for each clutch. The transmission selectively outputs an instruction current to a solenoid valve in order to supply hydraulic oil to the associated clutch and engage it.

In the gear shifting control device described above, the clutch engagement feeling does not always remain unchanged due, for instance, to the manufacturing error and assembling error involved in the transmission and solenoid valves even when the same instruction current is output to different solenoid valves for the transmission. Under such circumstances, learning control is exercised as indicated in Japanese Patent JP-A-2003-287119 to learn the clutch pressure, correct any clutch pressure error, and determine an optimum hydraulic pressure characteristic value.

Patent Document 1: JP-A-2003-287119

DISCLOSURE OF INVENTION

Problem to be Solved by the Invention

However, there is the following problem with a conventional learning control method for acquiring clutch hydraulic pressure characteristic values.

When, for instance, a transmission is assembled in a factory or overhauled in a market, the clutch hydraulic pressure is learned to correct any error and determine an optimum hydraulic pressure characteristic value. In such an instance, learning may fail due to incomplete transmission assembly or parts abnormality. In the event of such learning failure, it is possible to indicate which transmission clutch was learned for clutch hydraulic pressure learning at the time of learning failure, and determine which clutch is associated with the learning failure. However, since the information about the cause of learning failure was not acquired, it took a considerable amount of time to identify the cause of learning failure.

An object of the present invention is to provide a work machine gear shifting control device that is capable of readily identifying the cause of failure in learning the clutch hydraulic pressure for operating a transmission clutch.

Means for Solving the Problem (1) In accomplishing the above object, according to one aspect of the present invention, there is provided a gear shifting control device for a work machine having a torque converter and a transmission for transmitting the motive power of an engine to wheels to move the work machine, wherein the transmission has a plurality of clutches and selectively supplies hydraulic oil to the plurality of clutches for gear shifting purposes, the gear shifting control device comprising: learning control means, which is provided for each of the plurality of clutches, has a plurality of handling processes that are composed of a plurality of subprocesses, causes each of the plurality of clutches to learn the clutch hydraulic pressure in each of the plurality of handling processes, and determines clutch hydraulic pressure characteristic values for operating each clutch; and learning monitoring means, which formulates an error judgment in each of the plurality of handling processes to judge whether learning has failed in each of the plurality of subprocesses and displays the result of the judgment.

As described above, the learning control means is provided for each of the plurality of clutches, has a plurality of handling processes that are composed of a plurality of subprocesses, causes each of the plurality of clutches to learn the clutch hydraulic pressure in each of the plurality of handling processes, and determines the clutch hydraulic pressure characteristic values for operating each clutch. When learning error judgment means is added to the above configuration so as to formulate an error judgment in each of the plurality of handling processes to judge whether learning has failed in each of the plurality of subprocesses and display the result of the judgment, it is possible to identify a subprocess in which an error occurred. This makes it easy to identify the cause of learning failure (determine whether the transmission, solenoid valve, or other part is at fault).

(2) According to another aspect of the present invention, there is provided the gear shifting control device as described in (1) above, wherein the plurality of subprocesses in each of the plurality of handling processes include a first subprocess, which applies a trial hydraulic pressure to each of the plurality of clutches and incrementally raises the applied pressure a number of times to determine a reference clutch pressure at which the velocity ratio of the torque converter decreases to a predetermined judgment value, and a second subprocess, which determines the clutch hydraulic pressure characteristic values in accordance with the reference clutch pressure; and wherein the learning monitoring means monitors the number of times the trial hydraulic pressure is applied in the first subprocess, judges that an error has occurred if the velocity ratio of the torque converter is not decreased to the predetermined judgment value even when a limit is reached by the number of times the trial hydraulic pressure is applied, and displays the error.

(3) According to another aspect of the present invention, there is provided the gear shifting control device as described in (2) above, wherein, in the first subprocess, the learning monitoring means further judges that an error has occurred if the trial hydraulic pressure has been applied once when the velocity ratio of the torque converter is decreased to the predetermined judgment value, and displays the error.

(4) According to another aspect of the present invention, there is provided the gear shifting control device as described in (2) above, wherein, in the second subprocess, the learning monitoring means further applies a clutch pressure to each clutch in accordance with the clutch hydraulic pressure characteristic values, judges that an error has occurred if the resulting velocity ratio is outside an allowable range of the judgment value, and displays the error.

(5) According to another aspect of the present invention, there is provided the gear shifting control device as described in (1) above, wherein the learning monitoring means formulates an error judgment during learning in the plurality of handling processes to judge whether the environmental conditions for learning are satisfied, and displays the result of the judgment.

Consequently, an error judgment displayed during learning indicates that the environmental conditions are not satisfied, and does not indicate that an abnormality has occurred in the transmission during learning.

(6) According to another aspect of the present invention, there is provided the gear shifting control device as described in (5) above, wherein the learning monitoring means monitors the temperature of the hydraulic oil for operating the plurality of clutches and the rotation speed of the engine as the environmental conditions for learning during learning in the plurality of handling processes, judges that an error has occurred if the temperature of the hydraulic oil or the rotation speed of the engine is outside a predetermined allowable range, and displays the error.

(7) According to another aspect of the present invention, there is provided the gear shifting control device as described in (1) or (5) above, wherein the learning monitoring means further formulates an error judgment before proceeding to the plurality of handling processes to judge whether the environmental conditions for proceeding to the plurality of handling processes are satisfied, and displays the result of the judgment.

Consequently, an error judgment displayed before proceeding to a learning handling process indicates that the environmental conditions for learning are not satisfied before proceeding to the learning handling process, and does not indicate that an abnormality has occurred in the transmission during learning.

(8) According to another aspect of the present invention, there is provided the gear shifting control device as described in (7) above, wherein, before proceeding to the plurality of handling processes, the learning monitoring means monitors the temperature of the hydraulic oil for operating the plurality of clutches and the rotation speed of the engine as the environmental conditions for proceeding to the plurality of handling processes, judges that an error has occurred if the temperature of the hydraulic oil or the rotation speed of the engine is outside a predetermined allowable range, and displays the error.

(9) According to another aspect of the present invention, there is provided the gear shifting control device as described in (1) to (8) above, wherein the learning monitoring means normally causes a monitor, which displays velocity and other vehicle information, to display the progress of learning during learning by the learning control means, and displays the result of an error judgment that is formulated to indicate the occurrence of an error.

Consequently, the necessity for an additional monitor is eliminated to achieve a system configuration at low cost. Further, the overall flow of learning control can be grasped to exercise learning control with high efficiency because the occurrence of an error is indicated while displaying the progress of learning during learning control.

(10) According to still another aspect of the present invention, there is provided the gear shifting control device as described in (1) to (8) above, further comprising: storage means for storing the result of an error judgment formulated by the learning monitoring means; and communication means for outputting the judgment result stored in the storage means to an external terminal.

Consequently, it is possible to deliver the result of an error judgment to an external terminal, allow an external monitor to store error judgment results of a plurality of work machines, and display the stored error judgment results on the external monitor for evaluation and assessment purposes. The cause of learning failure related to the plurality of work machines can then be identified with high efficiency.

Advantages of the Invention

When the clutch hydraulic pressure for operating a transmission clutch is not successfully learned, the present invention can readily identify the cause of such failure and learn the clutch hydraulic pressure with high efficiency.

BRIEF DESCRIPTION OF DRAWINGS

FIG. 5 is a timing diagram illustrating a typical hydraulic pressure (clutch hydraulic pressure) control waveform (clutch hydraulic pressure waveform) that is obtained when a clutch is ON.

FIG. 6A shows the velocity ratio that changes with time when the trial hydraulic pressure is low during, for instance, an early trial stage (first cycle). FIGS. 6B and 6C show the velocity ratio that changes with time when the trial hydraulic pressure is sequentially increased during the subsequent trial cycles.

DESCRIPTION OF REFERENCE NUMERALS

Figure 1:
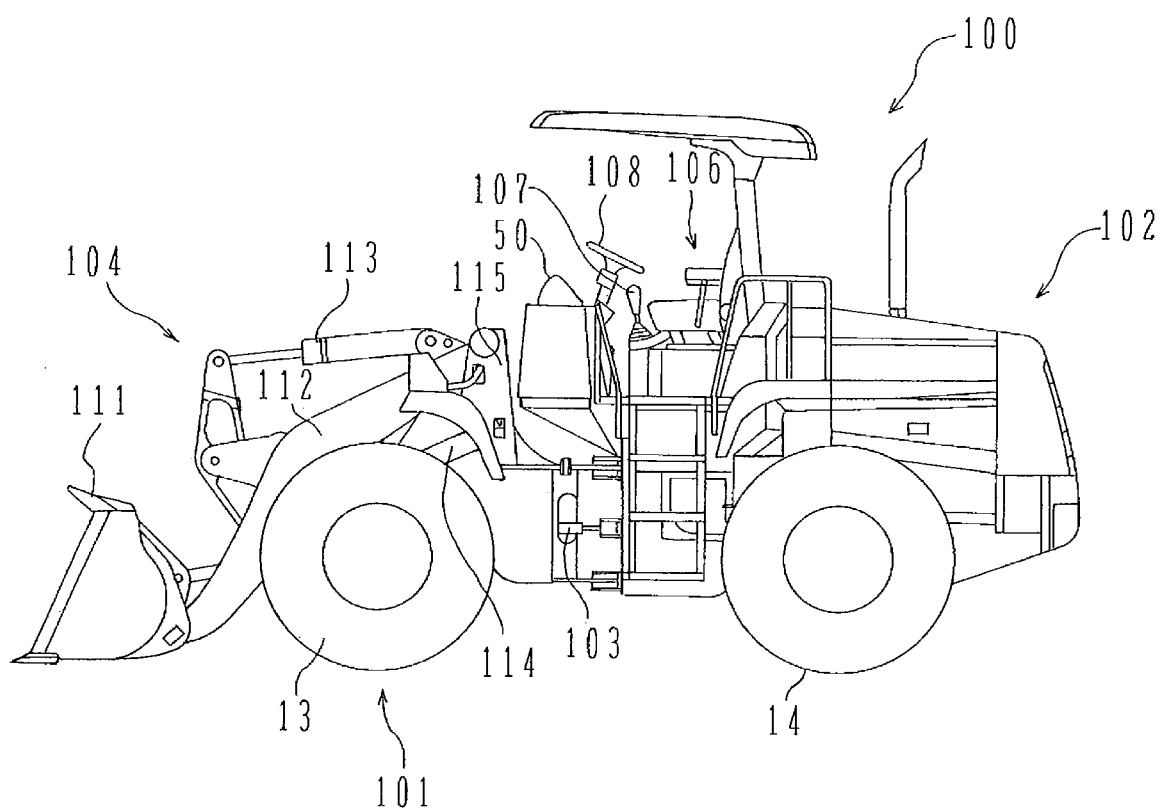
FIG. 1 is an external view illustrating a wheel loader (work machine) to which the present invention is applied.

10: Engine
11: Torque converter
12: Transmission
13: Front wheel
14: Rear wheel
21: Key switch
22: First learning switch
23: Second learning switch
24: Forward/reverse travel selector switch
25: Gear shifting switch
26: Engine rotation sensor
27: Torque converter output rotation sensor
28: Intermediate shaft rotation sensor
29: Transmission output shaft rotation sensor
30: Controller
31: Key switch judgment section
32: First learning switch judgment section
33: Second learning switch judgment section
34: Forward/reverse travel switch judgment section
35: Gear shifting switch judgment section
36: Engine rotation computation section
37: Torque converter output rotation computation section
38: Intermediate shaft rotation computation section
39: Transmission output shaft rotation computation section
40: Velocity ratio computation section
41: Vehicle velocity computation section
42: Rotation sensor error judgment section
43: Learning table storage section
44: Learned value storage section
45: Error storage section
46: Transmission gear shifting control section
47: Communication interface
48: External terminal
49: Monitor
51: Temperature sensor
52: Hydraulic oil temperature computation section
61: Forward travel clutch
62: Reverse travel clutch
63: First-gear clutch
64: Second-gear clutch
65: Third-gear clutch
66: Fourth-gear clutch
71-76: Hydraulic control valve
78: Main hydraulic pressure source
81-86: Solenoid valve
88: Pilot hydraulic pressure source
100: Wheel loader
101: Front vehicle body
102: Rear vehicle body
103: Steering cylinder
104: Front operating mechanism
106: Cab
107: Control lever
108: Steering wheel
111: Bucket
112: Boom
113: Bucket cylinder
114: Boom cylinder
115: Support section

BEST MODE FOR CARRYING OUT THE INVENTION

An embodiment of the present invention will now be described with reference to the accompanying drawings.

FIG. 1 is an external view illustrating a wheel loader (work machine) to which the present invention is applied. As shown in FIG. 1, the wheel loader 100 includes a front vehicle body 101 and a rear vehicle body 102. The front vehicle body 101 and rear vehicle body 102 are coupled together so that a steering cylinder 103 allows the front vehicle body 101 to freely turn and become variously oriented in relation to the rear vehicle body 102. The front vehicle body 101 includes a front operating mechanism 104. The rear vehicle body 102 includes a cab 106. The cab 106 is provided with operating control means such as a control lever 107 and a steering wheel 108.

The front operating mechanism 104 includes a bucket (operating tool) 111 and a boom 112. The bucket 111 performs a tilting/dumping operation as a bucket cylinder 113 telescopes. The boom 112 vertically moves as a boom cylinder 114 telescopes. The boom 112 and boom cylinder 114 are pin-coupled to a support section 115. The boom 112, boom cylinder 114, and support section 115 constitute a link mechanism.

Figure 2:
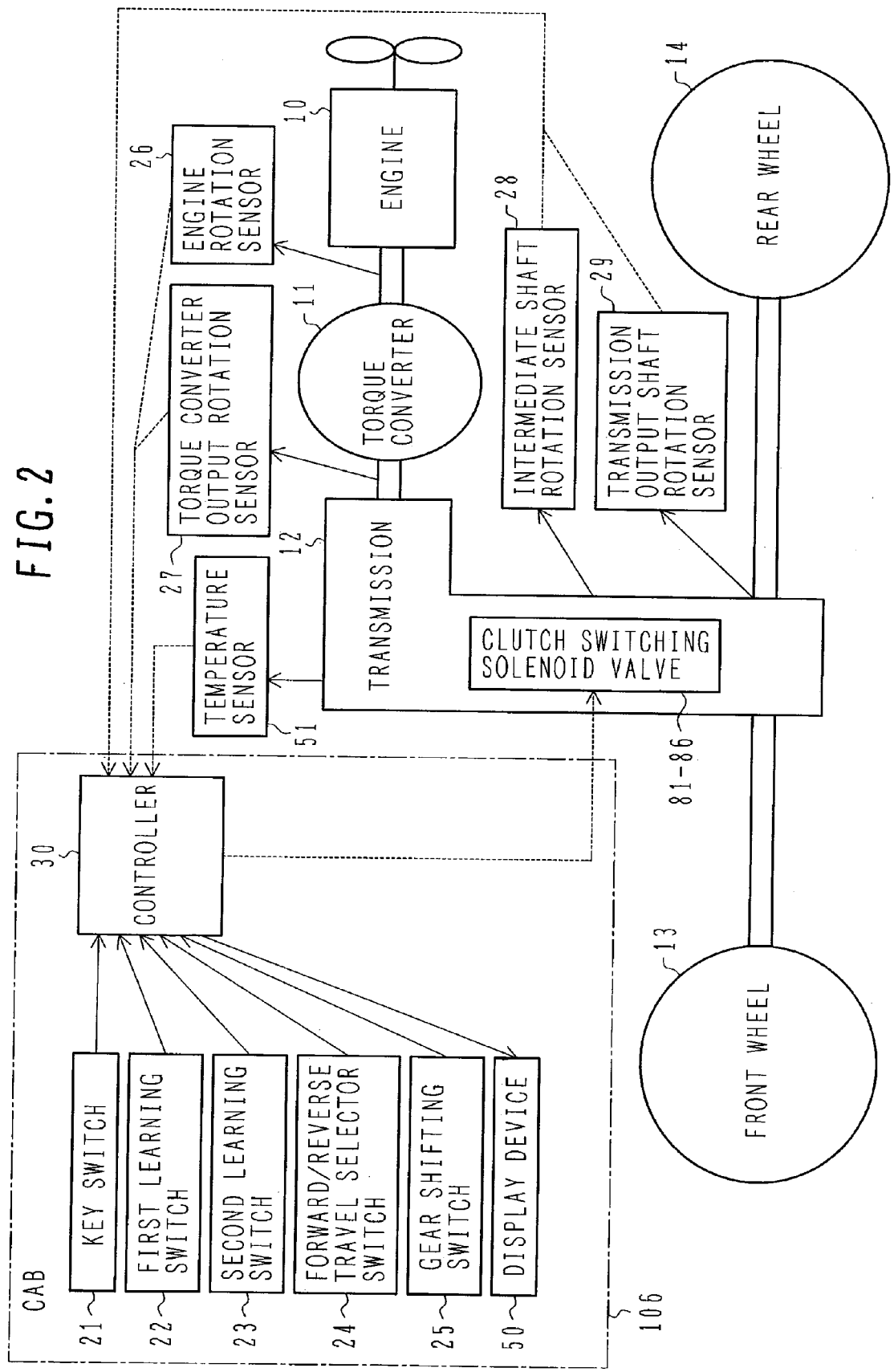
FIG. 2 is a schematic diagram illustrating the overall configuration of a travel system for a wheel loader (work machine) having a gear shifting control device according to an embodiment of the present invention.

FIG. 2 is a schematic diagram illustrating the overall configuration of a travel system for the wheel loader (work machine) 100 having a gear shifting control device according to an embodiment of the present invention.

As shown in FIG. 2, the travel system for the wheel loader 100 includes an engine 10, a torque converter 11, a transmission 12, front wheels 13, and rear wheels 14. The engine 10, torque converter 11, and transmission 12 are mounted in the rear vehicle body 102 of the wheel loader 100. The front wheels 13 and rear wheels 14 are provided for the front vehicle body 101 and rear vehicle body 102, respectively (see FIG. 1). The wheel loader 100 travels as motive power generated by the engine 10 is transmitted to the front wheels 13 and rear wheels 14 via the torque converter 11 and transmission 12.

Figure 3:
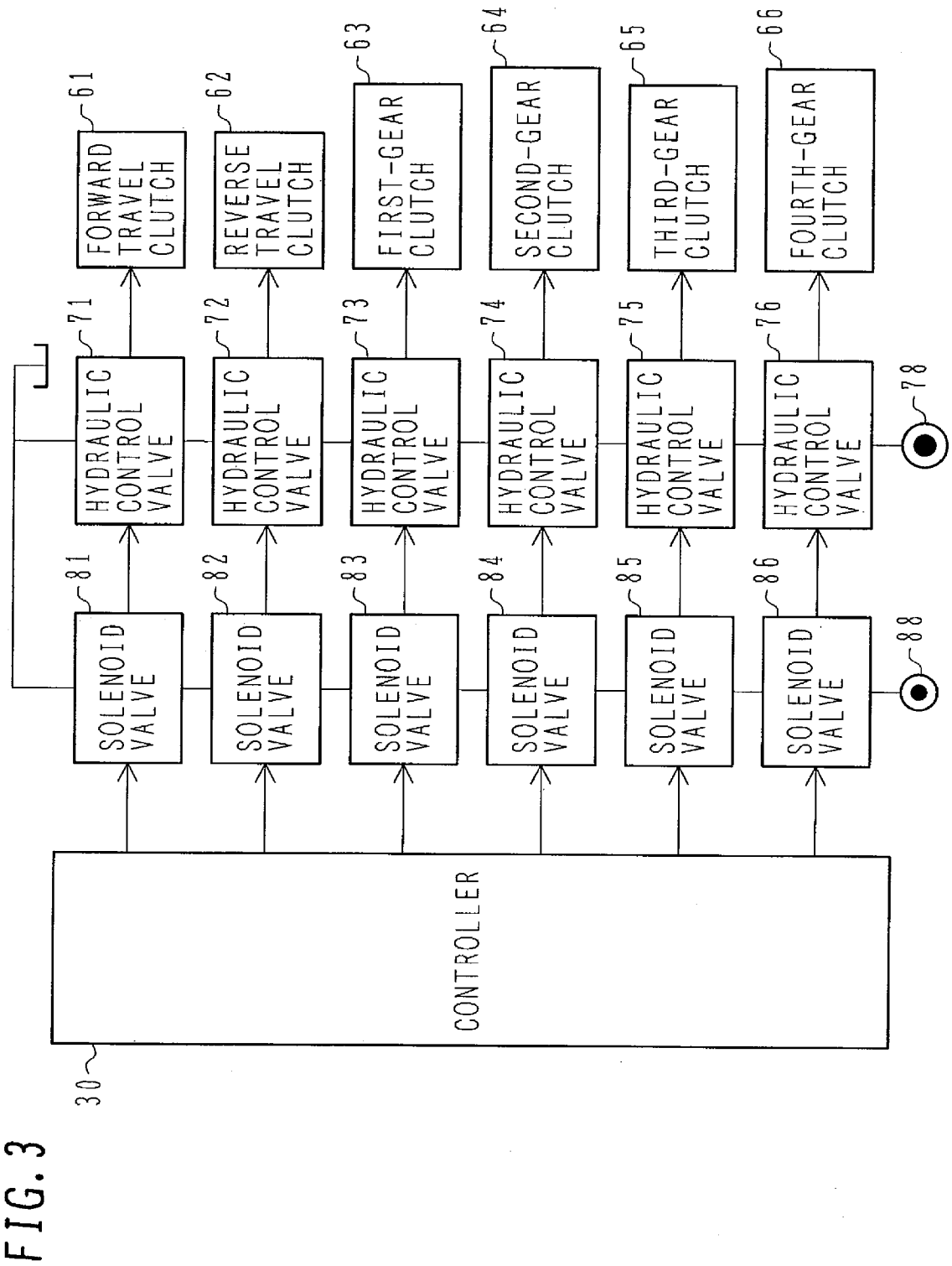
FIG. 3 shows the configuration of a clutch drive operating section of a transmission.

FIG. 3 shows the configuration of a clutch drive operating section of the transmission 12. The transmission 12 includes a forward travel clutch 61, a reverse travel clutch 62, a first-gear clutch 63, a second-gear clutch 64, a third-gear clutch 65, a fourth-gear clutch 66, hydraulic control valves 71-76 related to the clutches 62-66, and solenoid valves 81-86 related to the hydraulic control valves 71-76. The solenoid valves 81-86 are electrohydraulic conversion valves, which output a pilot hydraulic pressure based on an electrical signal while using the hydraulic pressure of a pilot hydraulic pressure source 88 as an initial pressure. The hydraulic control valves 71-76 are pressure amplification valves, which output hydraulic oil under a pressure proportional to the pilot hydraulic pressure delivered from the solenoid valves 81-86 while using the hydraulic pressure of a main hydraulic pressure source 78 as an initial pressure. The clutches 62-66 are hydraulic multiplate clutches, which turn ON and engage (as friction plates of a clutch come into contact with each other to achieve clutch engagement) when hydraulic oil is supplied from the hydraulic control valves 71-76 with the electrical signals of the associated solenoid valves 81-86 turned ON, and turn OFF and disengages (as the friction plates of a clutch separate from each other to achieve clutch disengagement) when no hydraulic oil is supplied from the hydraulic control valves 71-76 with the electrical signals of the associated solenoid valves 81-86 turned OFF.

The gear shifting control device according to the present embodiment is included in the travel system for the wheel loader 100 described above. The gear shifting control device includes a key switch 21, a first learning switch (learning SW 1) 22, a second learning switch (learning SW 2) 23, a forward/reverse travel selector switch 24, a gear shifting switch 25, an engine rotation sensor 26, a torque converter output rotation sensor 27, an intermediate shaft rotation sensor 28, a transmission output shaft rotation sensor 29, a hydraulic oil temperature sensor 51, a monitor (display device) 50, and a controller 30. The controller 30 inputs switch signals and sensor signals from the above-mentioned switches and sensors, performs a predetermined computation process on the input signals, outputs instruction signals (electrical signals) to the solenoid valves 81-86 in accordance with the results of the computation process, and outputs a traveling velocity, an error code, and other display signals to the monitor 50. The key switch 21 provides power supply control over the system. The first and second learning switches 21, 22 are used to start exercising learning control (initiate a learning mode). The monitor 50 is mounted in the cab 106 of the wheel loader 100 (see FIG. 1). Under normal conditions, the monitor 50 displays time and vehicle information such as a vehicle velocity (see FIG. 12).

Figure 4:
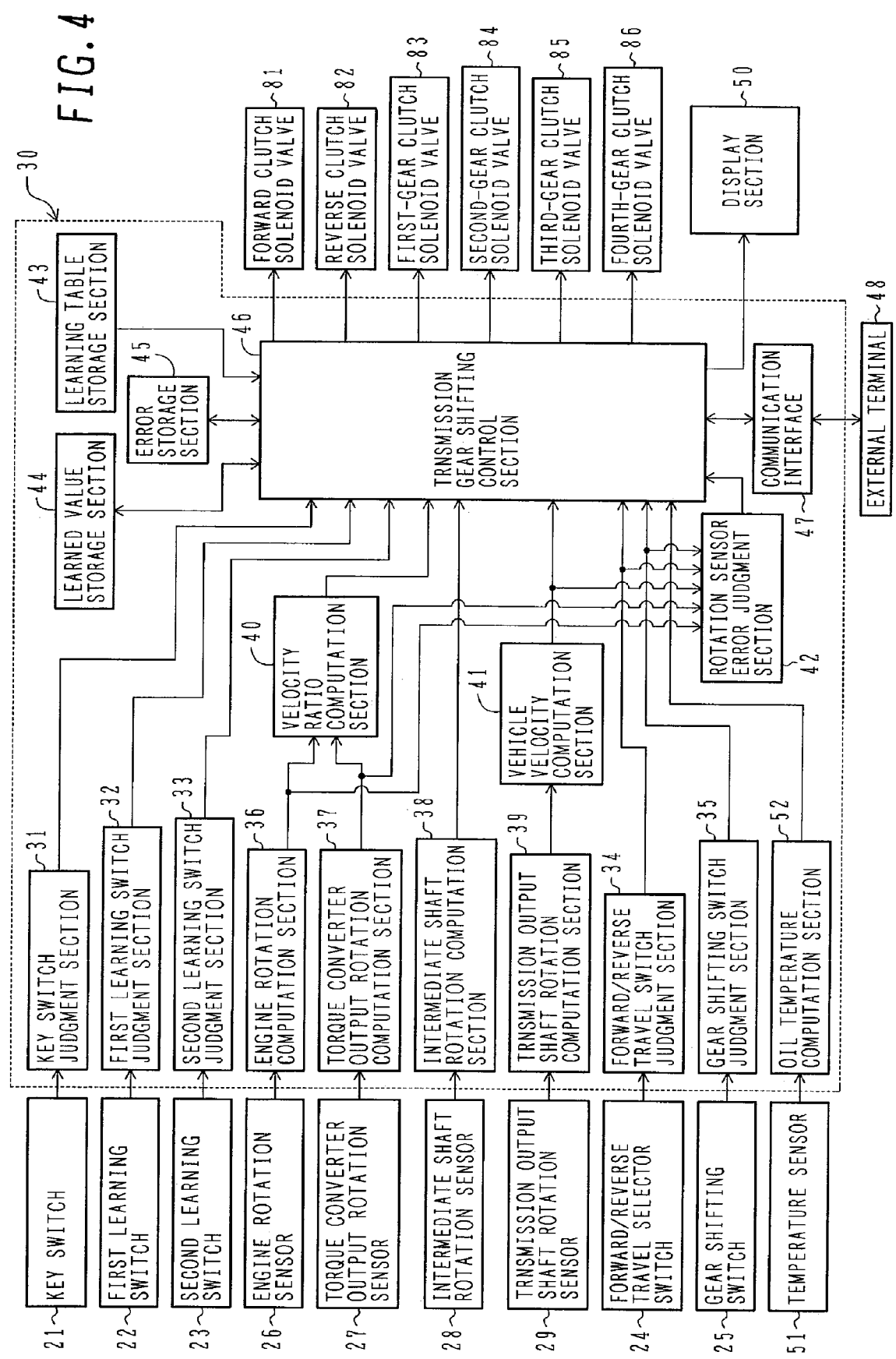
FIG. 4 is a functional block diagram illustrating the details of a process performed by a controller.

The process performed by the controller 30 will now be described in detail with reference to FIG. 4. FIG. 4 is a functional block diagram illustrating the process performed by the controller 30.

The controller 30 includes a key switch judgment section 31, a first learning switch judgment section 32, a second learning switch judgment section 33, a forward/reverse travel switch judgment section 34, a gear shifting switch judgment section 35, an engine rotation computation section 36, a torque converter output rotation computation section 37, an intermediate shaft rotation computation section 38, a transmission output shaft rotation computation section 39, a hydraulic oil temperature computation section 52, a velocity ratio computation section 40, a vehicle velocity computation section 41, a rotation sensor error judgment section 42, a learning table storage section 43, a learned value storage section 44, an error storage section 45, a transmission gear shifting control section 46, and a communication interface 47.

Switch signals from the key switch 21, first learning switch 22, and second learning switch 23 enter the key switch judgment section 31, first learning switch judgment section 32, and second learning switch judgment section 33. Switch signals from the forward/reverse travel selector switch 24 and gear shifting switch 25 enter the forward/reverse travel switch judgment section 34 and gear shifting switch judgment section 35. A pulse signal from the intermediate shaft rotation sensor 28 enters the intermediate shaft rotation computation section 38. An oil temperature signal from the hydraulic oil temperature sensor 51 enters the hydraulic oil temperature computation section 52. The key switch signal, first learning switch signal, and second learning switch signal that are judged by the judgment sections 31 to 33, the forward/reverse travel signal and gear shifting signal judged by the judgment sections 34 and 35, the intermediate shaft rotation speed (number of rotations) computed by the intermediate shaft rotation computation section 38, and the hydraulic oil temperature (oil temperature) computed by the hydraulic oil temperature computation section 52 enter the transmission gear shifting control section 46.

Pulse signals from the engine rotation sensor 26 and torque converter output rotation sensor 27 enter the engine rotation computation section 36 and torque converter output rotation computation section 37. These computation sections 36, 37 compute the respective rotation speeds (number of rotations) and enter them into the velocity ratio computation section 40. The velocity ratio computation section 40 computes a velocity ratio from the input rotation speeds and enters the computed velocity ratio into the transmission gear shifting control section 46. The input velocity ratio causes the transmission gear shifting control section 46 to grasp a traveling load.

A pulse signal from the transmission output shaft rotation sensor 29 enters the transmission output shaft rotation computation section 39. This computation section 39 computes the rotation speed (number of rotations) of a transmission output shaft and enters the computed rotation speed into the vehicle velocity computation section 41. The vehicle velocity computation section 41 computes the vehicle velocity from the input rotation speed and enters the computed vehicle velocity into the transmission gear shifting control section 46.

Various pieces of information from the forward/reverse travel switch judgment section 34, gear shifting switch judgment section 35, engine rotation computation section 36, torque converter output rotation computation section 37, intermediate shaft rotation computation section 38, and vehicle velocity computation section 41 enter the rotation sensor error judgment section 42. The rotation sensor error judgment section 42 formulates error judgments about the rotation sensors 26-29 in accordance with the input information, and enters judgment results into the transmission gear shifting control section 46.

The learning table storage section 43 stores a learning table (FIG. 7), which is used to determine clutch hydraulic pressure waveform control parameters (described later) from a reference clutch hydraulic pressure. The learned value storage section 44 stores a learned value indicating a trial hydraulic pressure. The error storage section 45 stores an error code that is generated in the event of learning failure. The error code stored in the error storage section 45 can be output to an external terminal 48 via the transmission gear shifting control section 46 and communication interface 47.

The transmission gear shifting control section 46 has the following functions.

1. Gear shifting control function
2. Learning control function

The gear shifting control function is a basic function of the transmission gear shifting control section 46. It can be exercised in either a manual mode or an automatic gear shifting mode. If the manual mode is selected with a mode switch (not shown), the transmission gear shifting control section 46 exercises forward/reverse travel control and gear shifting control by outputting instruction signals to the solenoid valves 81-86 that relate to the forward/reverse travel signal and gear shifting signal from the forward/reverse travel selector switch 24 and gear shifting switch 25. If, on the other hand, the automatic gear shifting mode is selected with the mode switch (not shown), the transmission gear shifting control section 46 performs a computation process for optimum gear selection by using the vehicle velocity information from the vehicle velocity computation section 41 and the velocity ratio information from the velocity ratio computation section 40, and exercises automatic gear shifting control by outputting instruction signals to the associated solenoid valves 81-86 in accordance with the result of the computation process.

As regards the learning control function, a plurality of handling processes are provided for the clutches 61-66. The plurality of handling processes are performed to learn the clutch hydraulic pressure for each clutch. The learned value (reference clutch hydraulic pressure described later) and the learning table stored in the learning table storage section 43 are used to determine clutch hydraulic pressure characteristic values for operating each clutch. The determined clutch hydraulic pressure characteristic values are stored in the learned value storage section 44. The learning control function according to the present embodiment includes a learning monitoring function. After learning control is initiated, the learning monitoring function is exercised to monitor a learning process and its environmental conditions, formulate an error judgment, which indicates whether the learning process is properly performed and whether the environmental conditions for the learning process are appropriate, display an error code on a display section of the monitor 50 to present the result of the error judgment, and store the error code in the error storage section 45.

The learning control function will now be described in detail.

First of all, the idea of learning control according to the present embodiment will be described.

Figure 5:
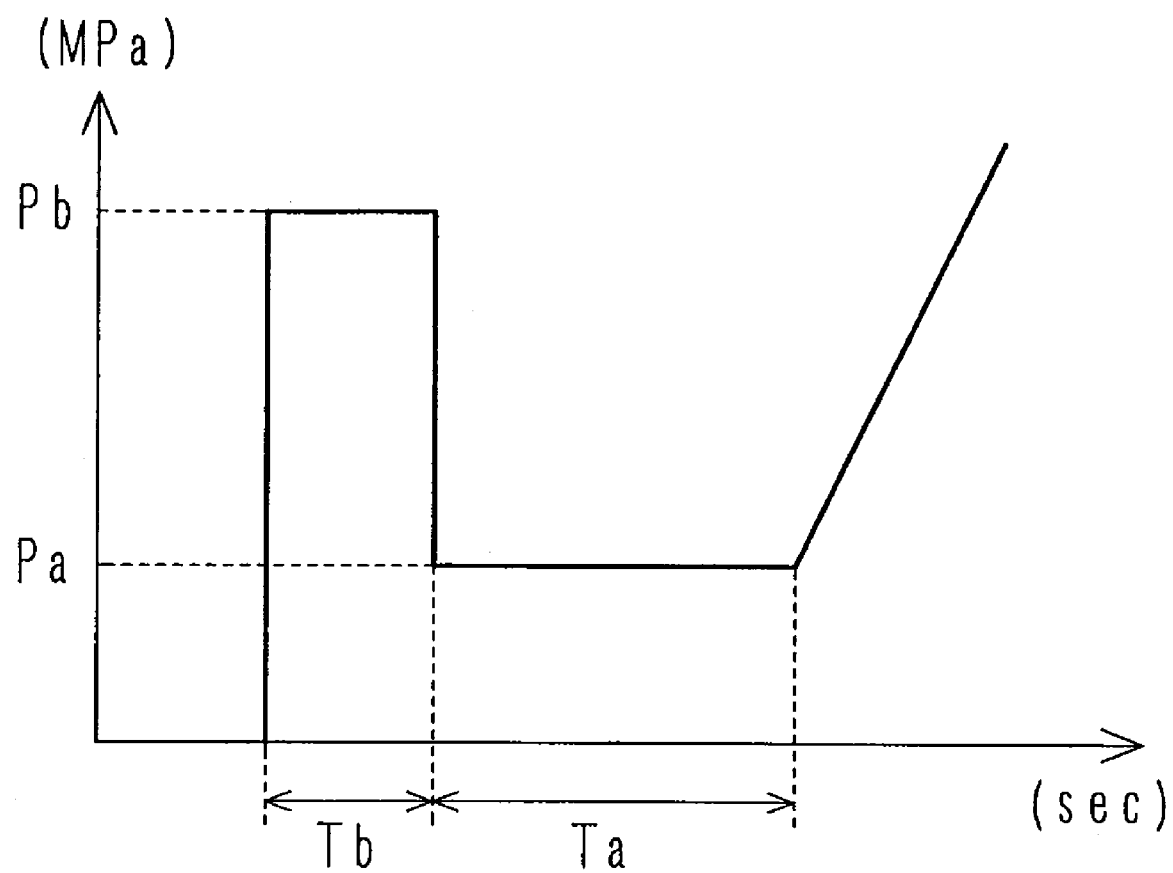

FIG. 5 is a timing diagram illustrating a typical hydraulic pressure (clutch hydraulic pressure) control waveform (clutch hydraulic pressure waveform) that is obtained when a clutch is ON.

First of all, the friction plates are rapidly brought close to each other to a predetermined extent (to a point just before partial clutch engagement) by rapidly supplying hydraulic oil under high pressure (rapid filling pressure Pb) at an early stage of clutch hydraulic pressure buildup. The symbol Tb represents the output time for the rapid filling pressure Pb. Subsequently, the hydraulic pressure is reduced to a low pressure (standby pressure Pa) until the friction plates come into contact with each other. After the friction plates are brought into contact with each other, the hydraulic pressure is gradually increased until the friction plates completely join. The symbol Ta represents the output time for the standby pressure Pa. The engagement shock generated upon clutch turn-ON can be reduced by properly setting the rapid filling pressure Pb, standby pressure Pa, time Tb, and time Ta. In this document, these values Pa, Pb, Ta, Tb are referred to as the clutch hydraulic pressure characteristic values.

However, since the clutch hydraulic pressure characteristic values Pa, Pb, Ta, and Tb vary due to the individual difference among the clutches, solenoid valves, and other component parts, it is necessary to absorb the individual difference prior to shipment. The individual difference can be absorbed by setting the clutch hydraulic pressure characteristic values Pa, Pb, Ta, and Tb through learning. In the present embodiment, the learning is conducted as described below.

1. In a trial for clutch hydraulic pressure increase, the velocity ratio of the torque converter 11 is measured when a predetermined period of time T elapses after trial hydraulic pressure output.

2. The reference clutch hydraulic pressure Pax at which the measured velocity ratio decreases to a predetermined judgment value is determined. More specifically, high and low judgment reference values, which correspond to a high velocity ratio (ehigh) and low velocity ratio (elow), respectively, are set as judgment values. Reference clutch hydraulic pressures Pax1 and Pax2, which correspond to the high and low judgment reference values, respectively, are determined. The mean value of the reference clutch hydraulic pressures Pax1 and Pax2 is obtained. The obtained mean value is used as the reference clutch hydraulic pressure Pax to determine the clutch hydraulic pressure characteristic values.

3. The clutch hydraulic pressure characteristic values Pa, Pb, Ta, and Tb are determined in accordance with the reference clutch hydraulic pressure Pax. In this case, the clutch hydraulic pressure characteristic values Pa, Pb, Ta, and Tb that correspond to the reference clutch hydraulic pressure Pax are tabulated as the clutch hydraulic pressure waveform control parameters to prepare the learning table (FIG. 7), and the clutch hydraulic pressure characteristic values Pa, Pb, Ta, and Tb are determined by retrieving the clutch hydraulic pressure waveform control parameters corresponding to the reference clutch hydraulic pressure Pax from the learning table.

The trial for clutch hydraulic pressure increase, which is mentioned under 1 above, is performed by stopping the vehicle (wheel loader 100), applying a parking brake to lock the axles of the wheel 13, 14, putting the transmission 12 in neutral, and driving the engine 10. While the transmission 12 is in neutral, all the clutches 61-66 are inoperative (OFF) so that the output shaft of the torque converter 11 is idling.

One cycle of the trial for pressure increase is completed by applying a predetermined trial hydraulic pressure Paa having a stepped waveform to a clutch targeted for hydraulic pressure characteristic value setup and measuring the velocity ratio e of the torque converter after an elapse of the predetermined period of time T. This trial cycle is repeated a number of times while gradually increasing the trial hydraulic pressure Paa. The predetermined period of time T (the time for outputting the trial hydraulic pressure Paa) varies from one model to another. After the velocity ratio e is measured in each trial cycle, the clutch hydraulic pressure is relieved once, and then the next trial hydraulic pressure is output.

Figure 6A:
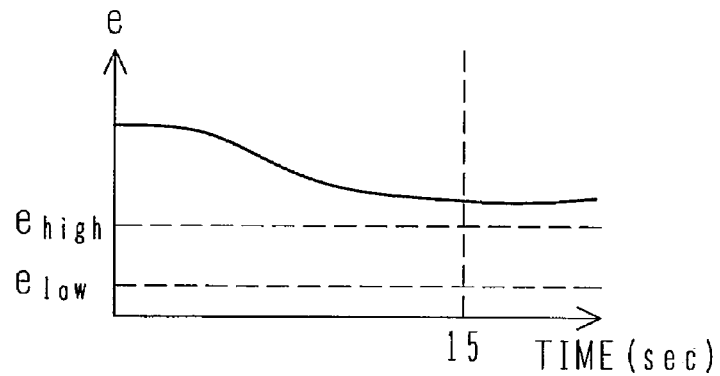
FIGS. 6A to 6C show how the velocity ratio changes with time after trial hydraulic pressure output.
Figure 6B:
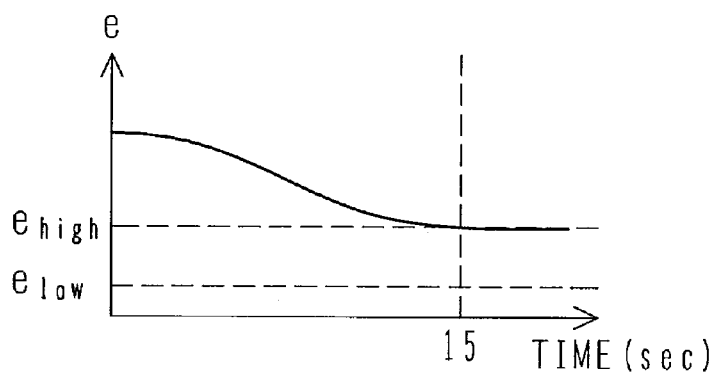
Figure 6C:
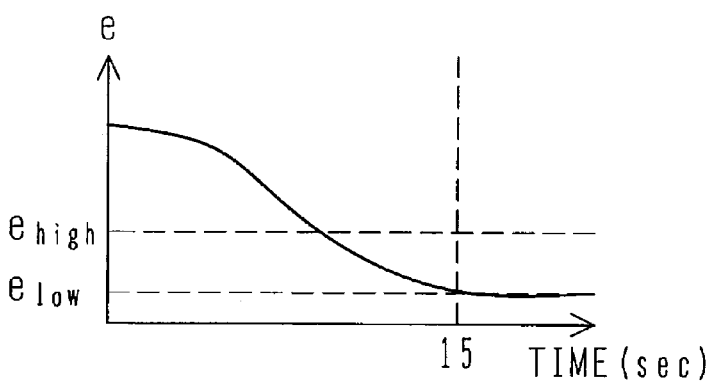

FIGS. 6A to 6C show how the velocity ratio e changes with time after the output of trial hydraulic pressure Paa. FIG. 6A shows the velocity ratio that changes with time when the trial hydraulic pressure Paa is low during, for instance, an early trial stage (first cycle). FIGS. 6B and 6C show the velocity ratio that changes with time when the trial hydraulic pressure Paa is sequentially increased during the subsequent trial cycles.

When the trial hydraulic pressure Paa is output, the clutch initiates a buffered engagement sequence (partial clutch engagement). Therefore, the velocity ratio e of the torque converter 11 decreases with time, and then virtually stabilizes while it is low. The predetermined period of time T is set at a point of time at which the decreased velocity ratio e begins to stabilize. In the present embodiment, the predetermined period of time T is set at 15 seconds. Since the engagement force varies when the trial hydraulic pressure Paa varies, the prevailing velocity ratio e varies as shown in FIGS. 6A, 6B, and 6C. In FIG. 6A, the trial hydraulic pressure Paa is low so that the velocity ratio e prevailing after an elapse of the predetermined period of time T does not decrease to the high judgment reference value ehigh. In FIG. 6B, the trial hydraulic pressure Paa is increased so that the velocity ratio e prevailing after an elapse of the predetermined period of time T has reached the high judgment reference value ehigh. In FIG. 6C, the trial hydraulic pressure Paa is further increased so that the velocity ratio e prevailing after an elapse of the predetermined period of time T has reached the low judgment reference value elow.

When the procedure indicated under 2 above is followed, the trial for pressure increase is repeated (FIG. 6A) while increasing the trial hydraulic pressure Paa in increments, for instance, of 1 digit (which is a minimum increment of a solenoid valve instruction signal and equivalent to approximately 0.008 Pa) until the velocity ratio e decreases below the high judgment reference value ehigh. When the velocity ratio e decreases below the high judgment reference value ehigh for the first time (FIG. 6B), the prevailing trial hydraulic pressure Pax1 is stored. The trial for pressure increase is then continued. When the velocity ratio e decreases below the low judgment reference value elow for the first time (FIG. 6C), the prevailing trial hydraulic pressure Pax2 is stored.

The high judgment reference value ehigh and low judgment reference value elow can be determined as described below. The clutch pressure at which clutch plates begin to come into contact with each other is the standby pressure Pa. While the standby pressure Pa prevails, the velocity ratio is virtually constant. The velocity ratios ehigh and elow are determined so that the velocity ratio prevailing at the standby pressure Pa is an intermediate value between the velocity ratios ehigh and elow. The present embodiment assumes that the velocity ratio prevailing at the standby pressure Pa is 0.75, and sets the values ehigh and elow at 0.85 (=0.75+0.1) and 0.65 (=0.75−0.1), respectively.

The reference clutch hydraulic pressure Pax is determined as a mean value between the obtained trial hydraulic pressures Pax1 and Pax2. That is, the reference clutch hydraulic pressure Pax=(Pax1+Pax2)/2.

Figure 7:
FIG. 7 shows a learning table that is prepared by using clutch hydraulic pressure characteristic values Pa, Pb, Ta, and Tb, which are associated with a reference clutch hydraulic pressure Pax, as clutch hydraulic pressure waveform control parameters.

FIG. 7 shows a learning table that is prepared by using the clutch hydraulic pressure characteristic values Pa, Pb, Ta, and Tb, which are associated with the reference clutch hydraulic pressure Pax, as the clutch hydraulic pressure waveform control parameters.

The learning table shown in FIG. 7 is used to reference the reference clutch hydraulic pressure Pax, which is determined as described above, retrieve the clutch hydraulic pressure waveform control parameters corresponding to the reference clutch hydraulic pressure Pax, and determine the clutch hydraulic pressure waveform control parameters such as the standby pressure Pa, rapid filling pressure Pb, standby pressure output time Ta, and rapid filling pressure output time Tb. Since the reference clutch hydraulic pressure Pax determined from the mean value, which is derived from two trials as described above, is associated with the atmospheric pressure in the learning table, it is possible to ensure that the variation of the parameter settings is smaller than when only one trial is made.

The learning table is prepared by subjecting a plurality of transmissions to bench testing and in-vehicle testing, variously changing the parameters (standby pressure Pa, rapid filling pressure Pb, standby pressure output time Ta, and rapid filling pressure output time Tb), measuring pressure waveform and torque variations, performing a trial-and-error process to determine optimum clutch hydraulic pressure waveform control parameters in association with the reference clutch hydraulic pressure Pax, and putting the determined clutch hydraulic pressure waveform control parameters in matrix form. This table is created for each type of clutch and stored in the learning table storage section 43.

The learning control function, which includes the learning monitoring function according to the present embodiment, will now be described in detail with reference to FIGS. 8 to 20. FIGS. 8 to 11 are flowcharts illustrating a learning control process. FIGS. 12 to 20 show information that appears on the monitor 50 during a learning process.

Figure 8:
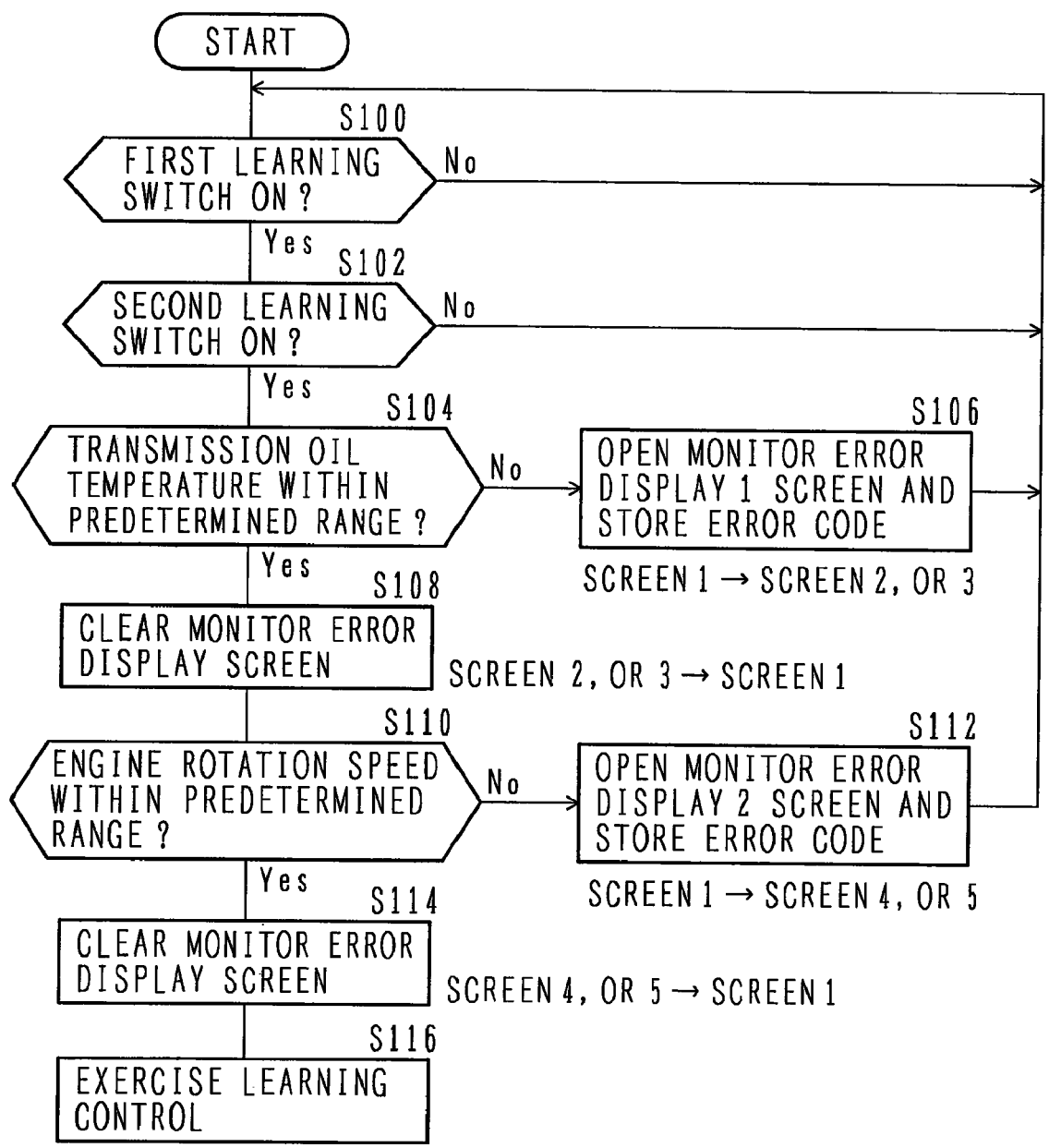
FIG. 8 is a flowchart illustrating an advance environment monitoring process, which is included in a learning control process according to an embodiment of the present invention.
Figure 9:
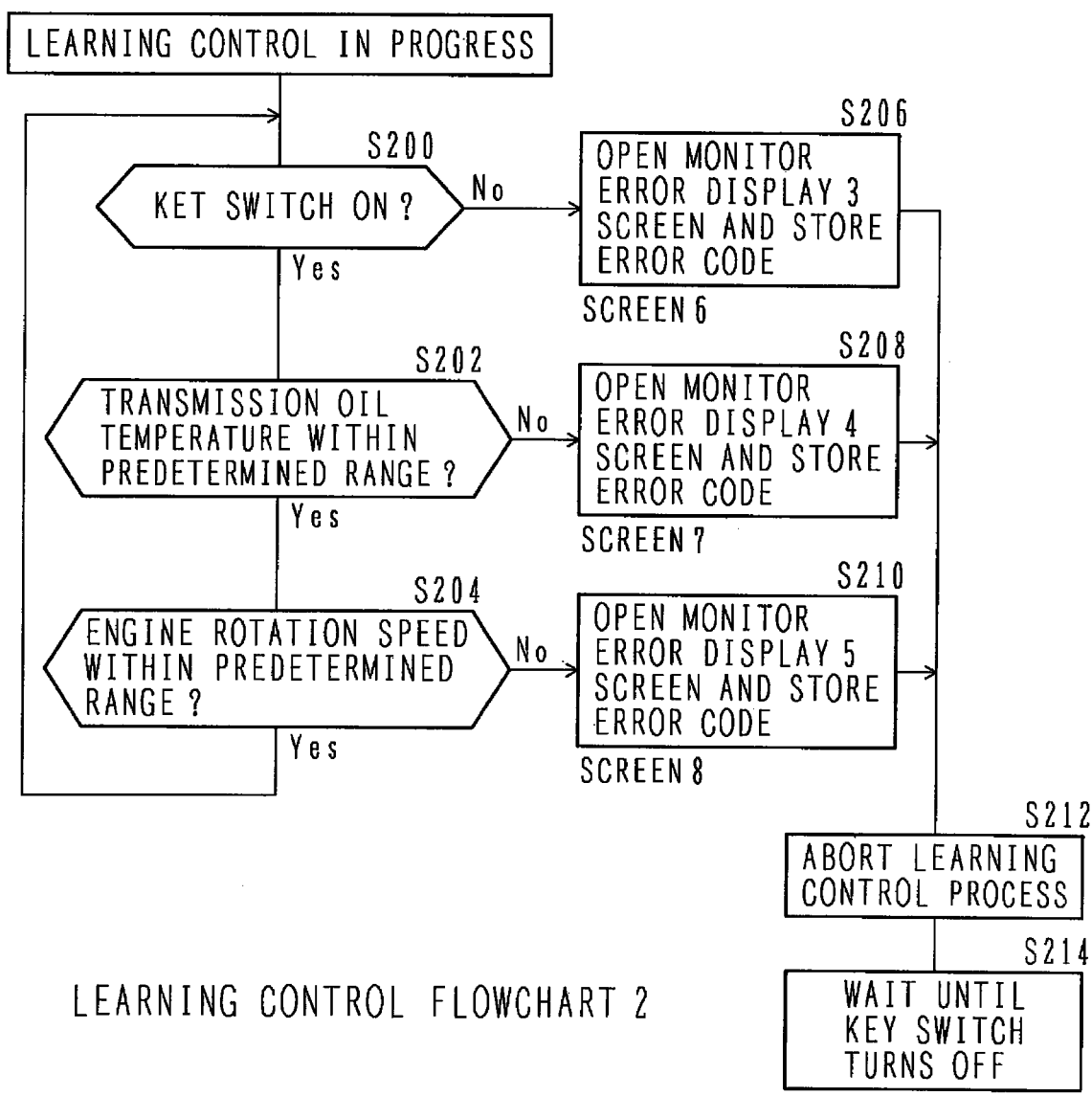
FIG. 9 is a flowchart illustrating an environment monitoring process during learning control, which is included in a learning control process according to an embodiment of the present invention.
Figure 10:
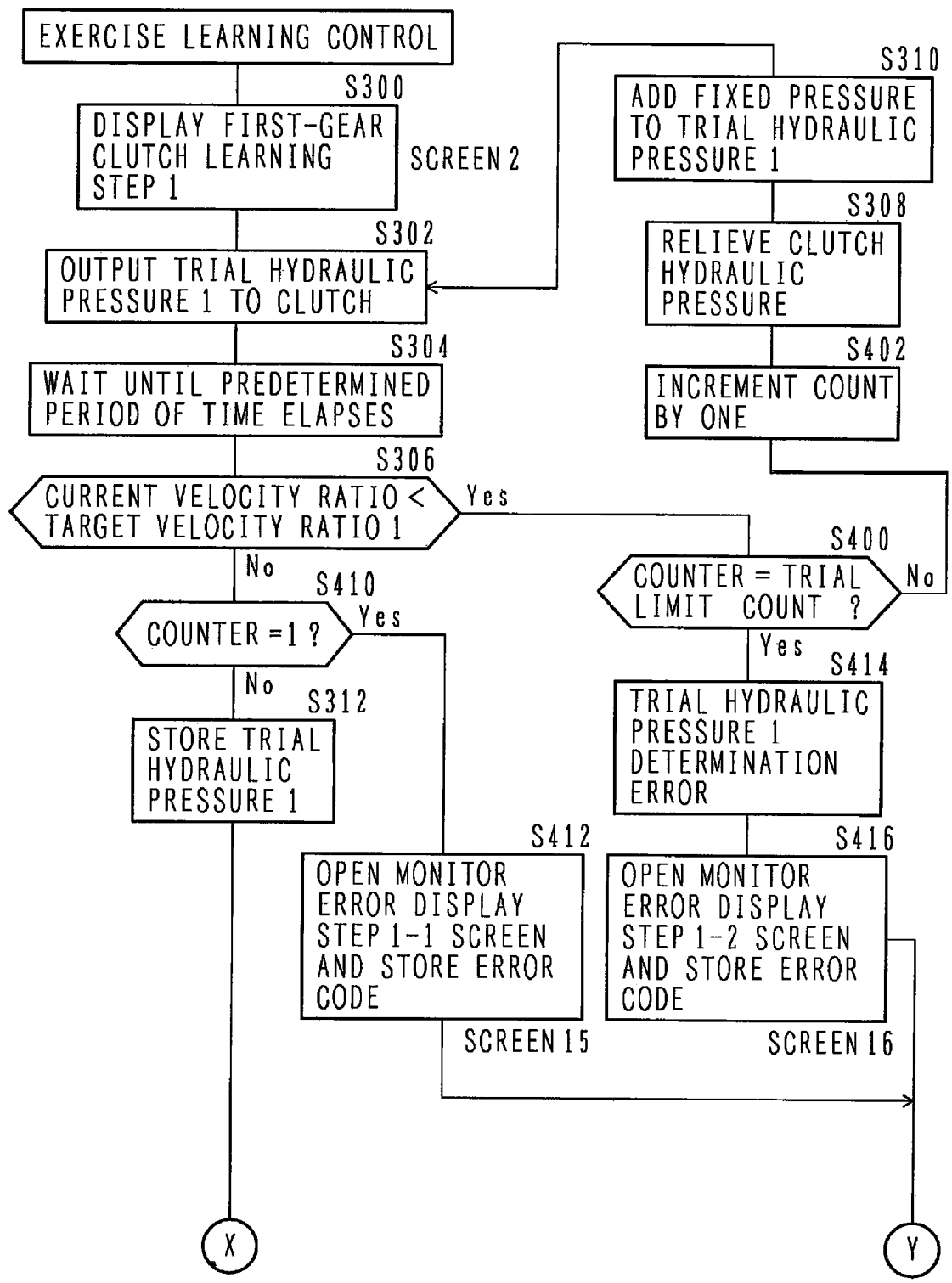
FIG. 10 is a flowchart illustrating learning control step 1 and its learning monitoring process, which are included in a learning control process according to an embodiment of the present invention.
Figure 11:
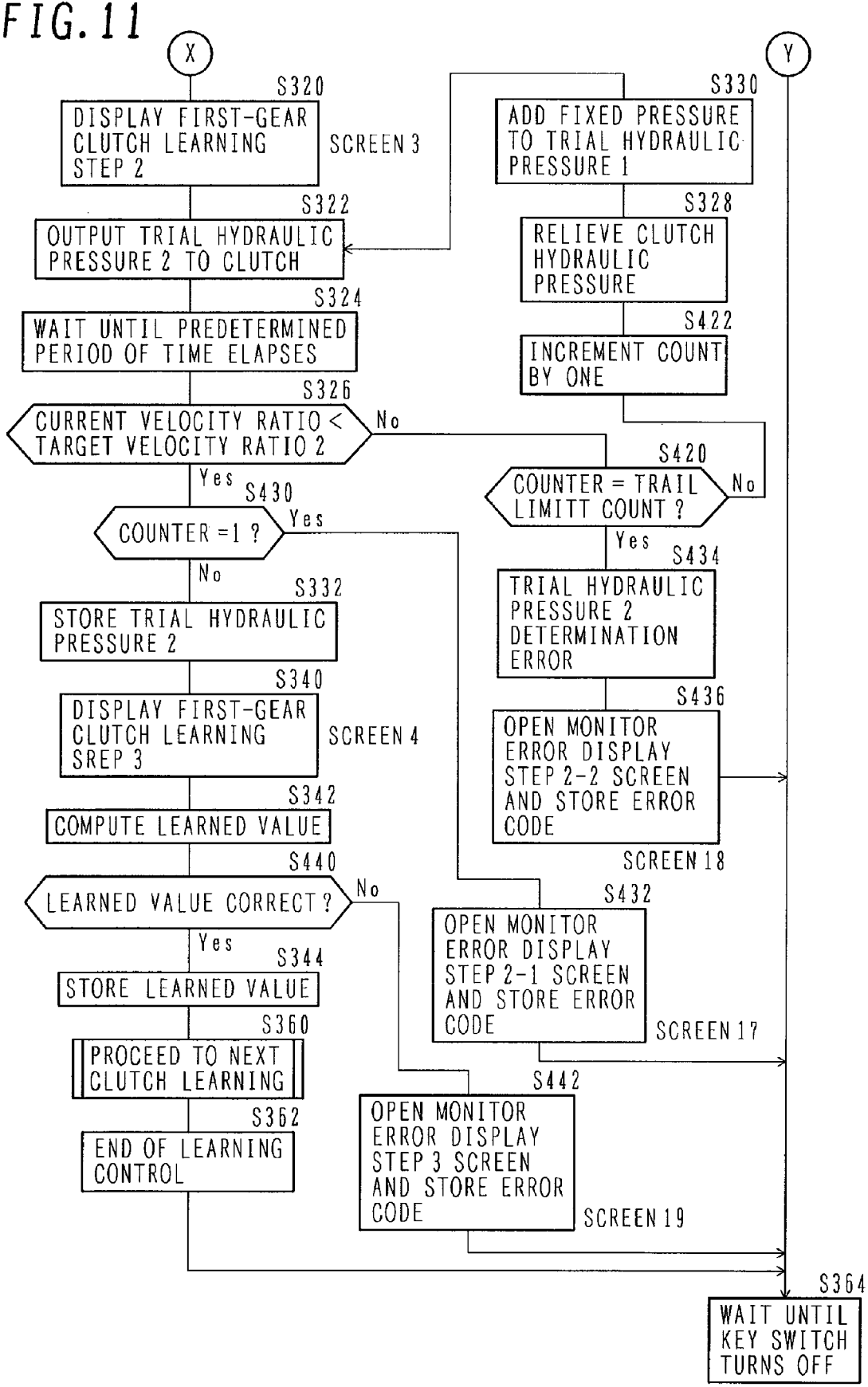
FIG. 11 is a flowchart illustrating learning control steps 2 and 3 and their learning monitoring processes, which are included in a learning control process according to an embodiment of the present invention.
Figure 12:
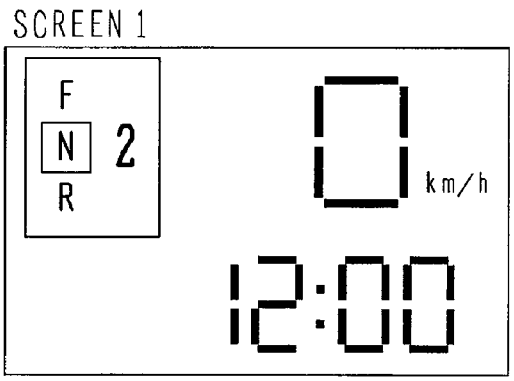
FIG. 12 shows a normal screen that appears on a monitor.
Figure 13:
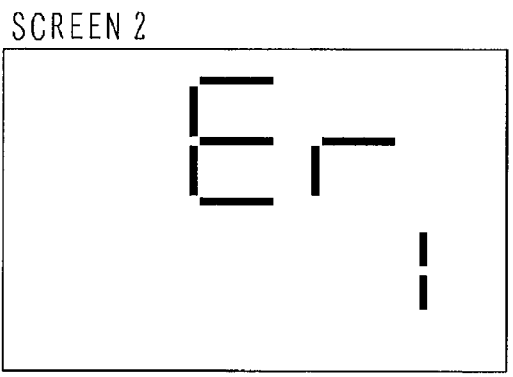
FIG. 13 shows screens that open when an oil temperature error judgment is formulated in the advance environment monitoring process.
Figure 13:
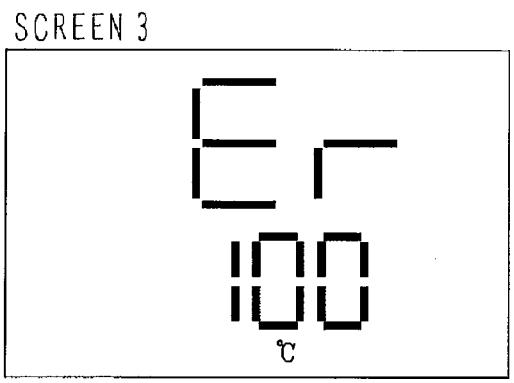
Figure 14:
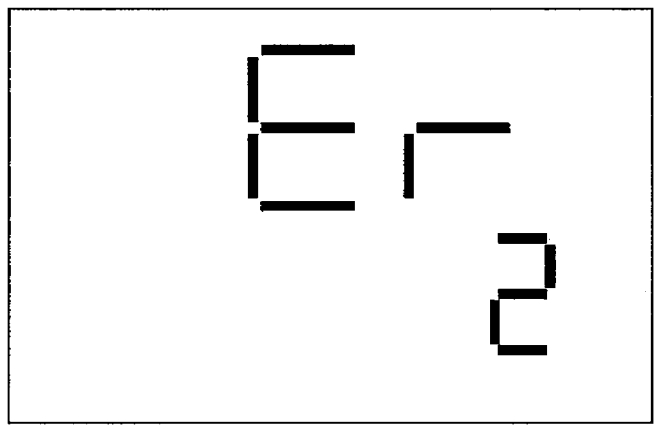
FIG. 14 shows screens that open when an engine rotation speed error judgment is formulated in the advance environment monitoring process.
Figure 14:
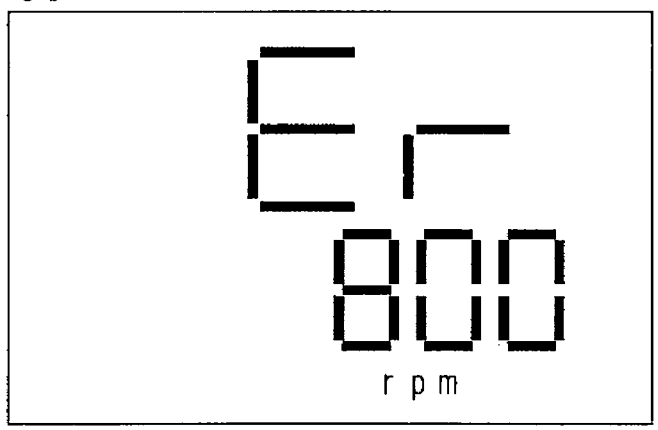
Figure 15:
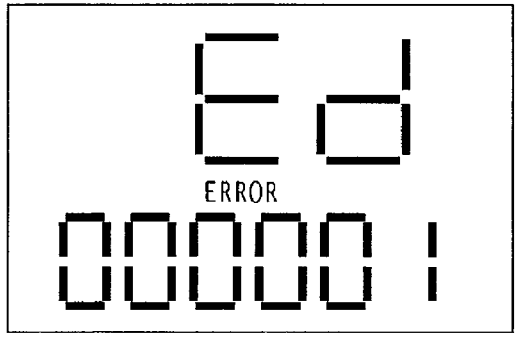
FIG. 15 shows screens that open when a key operation, engine rotation speed, or oil temperature error judgment is formulated in the environment monitoring process during learning control.
Figure 15:
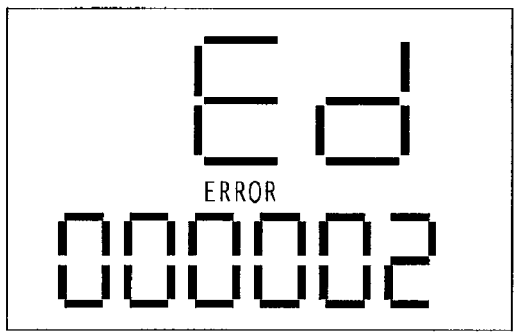
Figure 15:
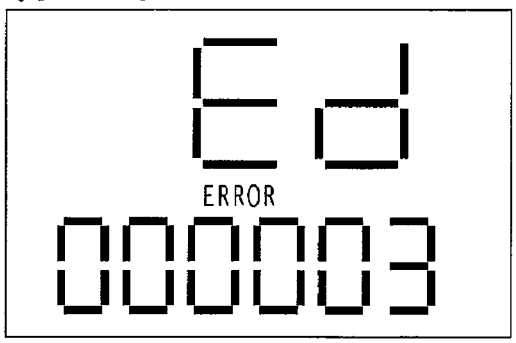
Figure 16:
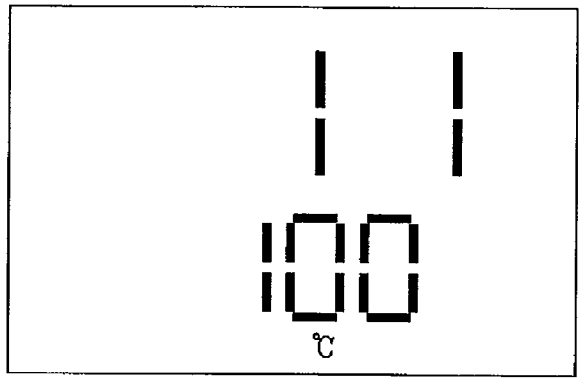
FIG. 16 shows screens that open when learning step 1, 2, or 3 is performed for a first-gear clutch during the learning control process.
Figure 16:
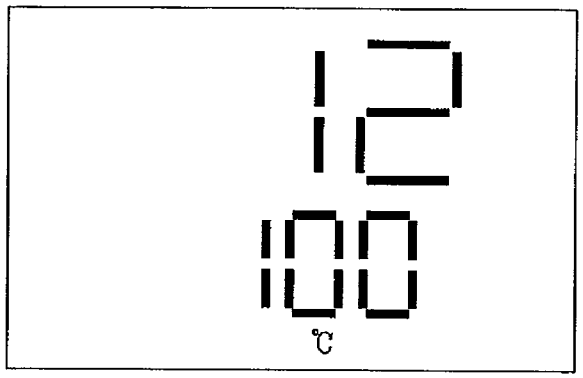
Figure 16:
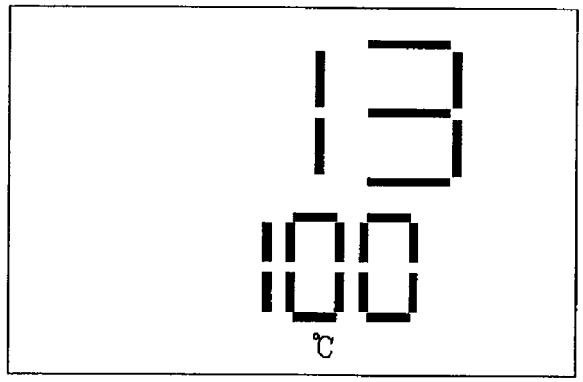

Learning control according to the present embodiment includes the following three processes.
1. Advance environment monitoring process
2. Environment monitoring process during learning
3. Learning/learning monitoring process FIG. 8 is a flowchart illustrating the advance environment monitoring process. FIG. 9 is a flowchart illustrating the environment monitoring process during learning. FIGS. 10 and 11 are flowcharts illustrating the learning/learning monitoring process. FIG. 12 shows a normal screen that appears on the monitor 50. FIGS. 13 and 14 show screens that open when an oil temperature or engine rotation speed error judgment is formulated in the advance environment monitoring process. FIG. 15 shows screens that open when a key operation, engine rotation speed, or oil temperature error judgment is formulated in the environment monitoring process during learning. FIGS. 16 to 20 show screens that open during the learning/learning monitoring process. The advance environment monitoring process, environment monitoring process during learning, and learning/learning monitoring process will be described below in the order named.

<Advance Environment Monitoring Process>

The advance environment monitoring process is performed to monitor whether the environmental conditions for a learning process are satisfied. It is performed during the time interval between the instant at which the gear shifting control device enters the learning mode to exercise learning control and the instant at which the gear shifting control device proceeds to a learning process.

Referring to FIG. 8, the transmission gear shifting control section 46 first performs steps S100 and S102 to judge whether the first learning switch 22 and second learning switch 23 are both ON, that is, whether the gear shifting control device has entered the learning mode to exercise learning control. When both switches are ON, steps S104 and S110 are performed to judge whether the clutch hydraulic oil temperature (oil temperature) of the transmission 12 and the rotation speed of the engine 10 are within predetermined allowable ranges. The oil temperature is indicated by a value that is computed by the hydraulic oil temperature computation section 52, whereas the engine rotation speed is indicated by a value that is computed by the engine rotation speed computation section 36. If the oil temperature judgment result indicates that the oil temperature is outside the predetermined allowable range, step S106 is performed to switch the screen displayed on the monitor 50 from the normal screen (screen 1), which is shown in FIG. 12, to screen 2 or 3, which is a monitor error display 1 screen shown in FIG. 13, alternate between screen 2 and screen 3 at 1.5-second intervals to alternately display error code Er1 (screen 2) and oil temperature (screen 3), and store error code Er1 in the error storage section 45. If the engine rotation speed judgment result indicates that the engine rotation speed is outside the predetermined allowable range, step S112 is performed to switch the screen displayed on the monitor 50 from the normal screen (screen 1), which is shown in FIG. 12, to screen 4 or 5, which is a monitor error display 2 screen shown in FIG. 14, alternate between screen 4 and screen 5 at 1.5-second intervals to alternately display error code Er2 (screen 4) and engine rotation speed (screen 5), and store error code Er2 in the error storage section 45. When both the first learning switch 22 and second learning switch 23 are subsequently turned ON while the oil temperature and engine rotation speed are within the predetermined allowable ranges, steps S108 and S114 are performed to switch the screen displayed on the monitor 50 back to the normal screen (screen 1). Processing then proceeds to step S116 in which a learning process is performed. If the conditions for proceeding to a learning process are not satisfied, the monitor 50 alternates between screen 2 and screen 3 or screen 4 and screen 5 as described above to alternately display an error code and current oil temperature or engine rotation speed. This feature makes it easy to recognize whether the conditions are satisfied.

<Environment Monitoring Process During Learning>

The environment monitoring process during learning is performed during a learning process to judge whether the conditions for learning are satisfied.

Referring to FIG. 9, the transmission gear shifting control section 46 performs steps S200, S202, and S204 during a learning process to monitor the key switch 21, oil temperature, and engine rotation speed while performing the learning process. If the key switch 21 turns OFF during learning or the oil temperature or engine rotation speed falls outside the predetermined allowable range during learning, the transmission gear shifting control section 46 performs step S206, S208, or S210 to switch the screen displayed on the monitor 50 from the normal screen (screen 1) to screen 6, 7, or 8, which is a screen for monitor error display 3, 4, or 5 as indicated in FIG. 15, display error code Ederror000001, Ederror000002, or Ederror000003, and store the error code in the error storage section 45. Next, the transmission gear shifting control section 46 performs step S212 to abort the learning process. Further, when the oil temperature or engine rotation speed falls outside the predetermined allowable range, step S214 is followed to wait until the key switch 21 turns OFF. The operator subsequently turns OFF the key switch 21 and then turns the key switch 21 back ON to resume learning.

<Learning/Learning Monitoring Process>
<Learning Process>

The learning process is performed on the basis of the idea described above and in order, for instance, from the first-gear clutch 63 through the second-gear clutch 64, the third-gear clutch 65, the fourth-gear clutch 66, and the forward travel clutch 61 to the reverse travel clutch 62. For each clutch, the learning process is performed in three steps (steps 1, 2, and 3) as shown in FIGS. 10 and 11. Learning step 1 is performed to determine the reference clutch hydraulic pressure Pax1 for the above-mentioned high judgment value. Learning step 2 is performed to determine the reference clutch hydraulic pressure Pax2 for the above-mentioned low judgment value. Learning step 3 is performed to determine the clutch hydraulic pressure characteristic values Pa, Pb, Ta, and Tb by examining the learning table in accordance with the above-mentioned reference clutch hydraulic pressure Pax.

First of all, a step 1 process is performed for the first-gear clutch 63. The transmission gear shifting control section 46 switches the screen displayed on the monitor 50 to screen 9, which is a first-gear clutch learning step 1 screen shown in FIG. 16, and displays the oil temperature and code "11," which indicates that the step 1 process is currently performed for the first-gear clutch 63 (step S300). Next, the transmission gear shifting control section 46 performs the step 1 process by outputting an instruction signal, which corresponds to trial hydraulic pressure 1, to the solenoid valve 83 and applying trial hydraulic pressure 1 to the first-gear clutch 63. First of all, step S302 is performed to apply trial hydraulic pressure 1 to the first-gear clutch 63 by outputting the instruction signal corresponding to trial hydraulic pressure 1 to the solenoid valve 83. After an elapse of a predetermined period of time (which corresponds to the aforementioned predetermined period of time T), steps S304 and S306 are performed to measure the current velocity ratio of the torque converter 11 and judge whether the measured velocity ratio is lower than target velocity ratio 1 (which corresponds to the aforementioned high judgment reference value ehigh). If the measured velocity ratio is not lower than target velocity ratio 1, step S308 is performed to relieve the clutch hydraulic pressure corresponding to trial hydraulic pressure 1. Subsequently, step S310 is performed to calculate new trial hydraulic pressure 1 by adding a fixed pressure to trial hydraulic pressure 1. Step S302 is then performed to apply trial hydraulic pressure 1 to the first-gear clutch 63 by outputting an instruction signal corresponding to the calculated trial hydraulic pressure 1 to the solenoid valve 83. Subsequently, the above procedure is repeated. When the current velocity ratio is lower than target velocity ratio 1 (high judgment reference value ehigh), step S312 is performed to store the prevailing trial hydraulic pressure 1 as the reference clutch hydraulic pressure Pax1.

When step 1 learning is successfully done, a step 2 process is performed for the first-gear clutch 63. Step S320 is performed to switch the screen displayed on the monitor 50 to screen 10, which is a first-gear clutch learning step 2 screen shown in FIG. 16, and display the oil temperature and code "12," which indicates that the step 2 process is currently performed for the first-gear clutch 63. Next, the step 2 process is performed to apply trial hydraulic pressure 2 to the first-gear clutch 63 by outputting an instruction signal corresponding to trial hydraulic pressure 2 to the solenoid valve 83. In this process, step S322 is first performed to apply trial hydraulic pressure 2 to the first-gear clutch 63 by outputting the instruction signal corresponding to trial hydraulic pressure 2 (>trial hydraulic pressure 1) to the solenoid valve 83. After an elapse of a predetermined period of time (which corresponds to the aforementioned predetermined period of time T), steps S324 and S326 are performed to measure the current velocity ratio of the torque converter 11 and judge whether the measured velocity ratio is lower than target velocity ratio 2 (which corresponds to the aforementioned low judgment reference value elow). If the measured velocity ratio is not lower than target velocity ratio 2, step S328 is performed to relieve the clutch hydraulic pressure corresponding to trial hydraulic pressure 2. Subsequently, step S330 is performed to calculate new trial hydraulic pressure 2 by adding a fixed pressure to trial hydraulic pressure 2. Step S322 is then performed to apply trial hydraulic pressure 2 to the first-gear clutch 63 by outputting an instruction signal corresponding to the calculated trial hydraulic pressure 2 to the solenoid valve 83. Subsequently, the above procedure is repeated. When the current velocity ratio is lower than target velocity ratio 2 (low judgment reference value elow), step S332 is performed to store the prevailing trial hydraulic pressure 2 as the reference clutch hydraulic pressure Pax2.

When step 2 learning is successfully done, a step 3 process is performed for the first-gear clutch 63. Step S340 is performed to switch the screen displayed on the monitor 50 to screen 11, which is a first-gear clutch learning step 3 screen shown in FIG. 16, and display the oil temperature and code "13," which indicates that the step 3 process is currently performed for the first-gear clutch 63. Next, step S342 is performed to compute learned values from the reference clutch hydraulic pressures Pax1, Pax2 determined in learning steps 1 and 2. Step S344 is then performed to store the computed learned values (clutch hydraulic pressure characteristic values). In the learned value computation, the reference clutch hydraulic pressure Pax (=(Pax1+Pax2)/2) is determined as a mean value between the reference clutch hydraulic pressures Pax1 and Pax2 as described above, and the learning table, which is shown in FIG. 7 and stored in the learning table storage section 43, is referenced to retrieve clutch hydraulic pressure waveform control parameters for the reference clutch hydraulic pressure Pax and determine the clutch hydraulic pressure characteristic values, which are the standby pressure Pa, rapid filling pressure Pb, standby pressure output time Ta, and rapid filling pressure output time Tb.

Figure 17:
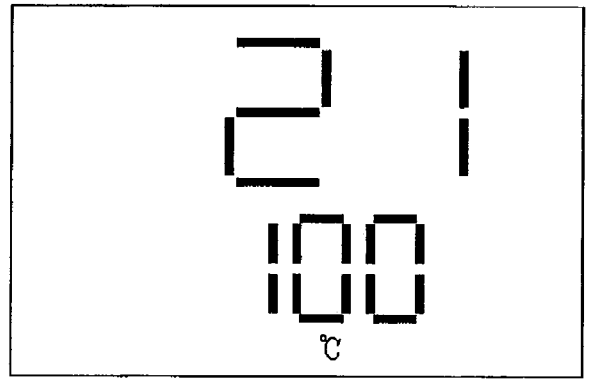
FIG. 17 shows a screen that opens when a learning step is performed for a second-gear clutch or reverse travel clutch during the learning control process, and a screen that opens when learning is successful.
Figure 17:
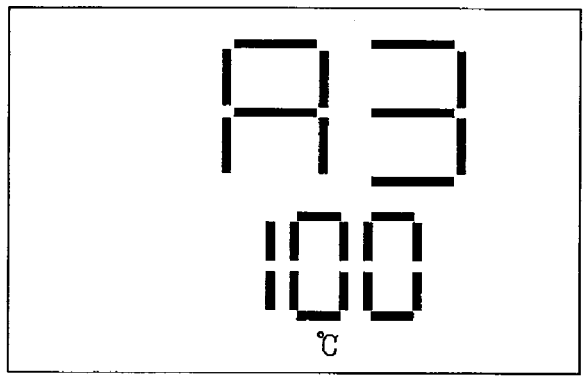
Figure 17:
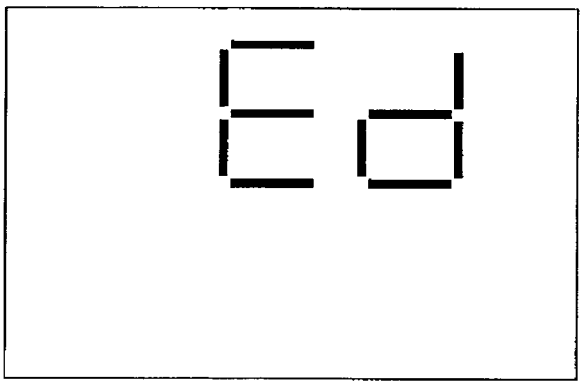

When step 3 learning is successfully done for the first-gear-clutch 63, processing proceeds to the learning process for the second-gear clutch 64. Eventually, processing proceeds to the learning process for the reverse travel clutch 62 (step S360). Screen 12, which is shown in FIG. 17, is a step 1 learning process screen for the second-gear clutch 64. Screen 13 is a step 3 learning process screen for the reverse travel clutch 62. When entire learning is successfully done, screen 14, which is shown in FIG. 17, opens to wait until the key switch 21 turns OFF (steps S362 and S364).

<Learning Monitoring Process>

Figure 18:
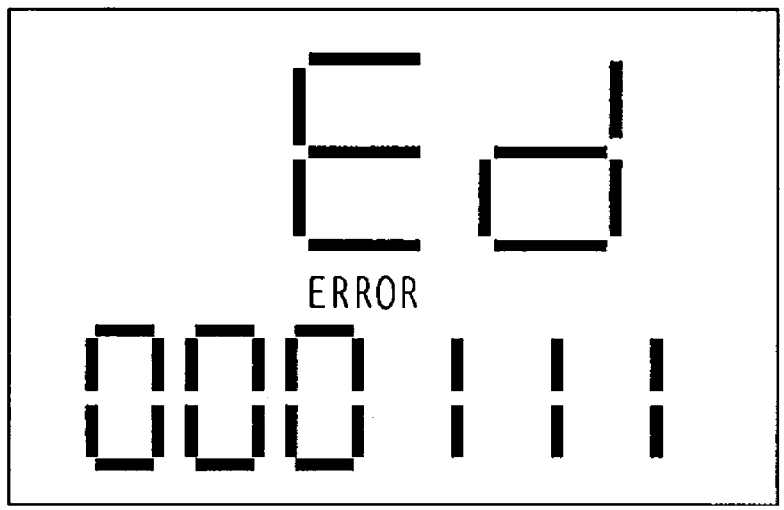
FIG. 18 shows screens that open when learning step 1-1 or 1-2 is not successfully performed for the first-gear clutch during a learning monitoring process.
Figure 18:
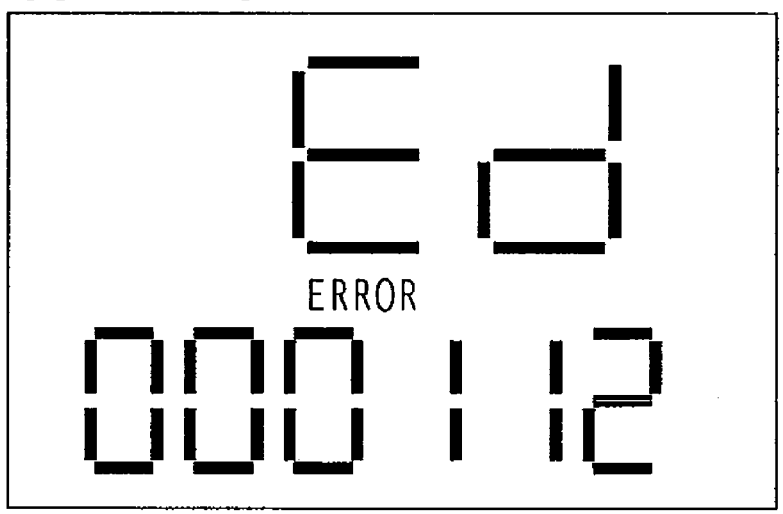

A plurality of checkpoints are provided for each of the step 1 to step 3 handling processes (subprocesses) of the learning process described above. A learning monitoring process is performed at each checkpoint to judge whether learning is normally conducted. If this process judges that learning is unsuccessful, it switches the screen displayed on the monitor 50 to screen 15, 16, 17, 18, 19, or 20, which are shown in FIG. 18, and displays the judgment result.

The learning monitoring process for the step 1 handling process is performed as described below. In the step 1 process, steps S302, S304, and S306 are performed as described earlier to apply trial hydraulic pressure 1 to the first-gear clutch 63, measure the prevailing velocity ratio of the torque converter 11 after an elapse of the predetermined period of time (which corresponds to the predetermined period of time T), and judge whether the measured velocity ratio is lower than target velocity ratio 1 (which corresponds to the aforementioned high judgment reference value ehigh). If the obtained judgment result does not indicate that the measured velocity ratio is lower than target velocity ratio 1, steps S308, S310, and S302 are performed to calculate new trial hydraulic pressure 1 and repeat the above procedure. In this instance, the transmission gear shifting control section 46 uses a counter to count the number of trials (step S402). When the current velocity ratio is lower than target velocity ratio 1 (high judgment reference value ehigh), step S410 is performed to judge whether the value of the counter is 1. If the value of the counter is not 1, the prevailing trial hydraulic pressure 1 is stored as the reference clutch hydraulic pressure Pax1 as described earlier. However, if the value of the counter is 1, step S412 is performed to switch the screen displayed on the monitor 50 to screen 15, which is a monitor error display step 1-1 screen shown in FIG. 18, display error code Ederror000111, which indicates a learning failure in step 1-1 for the first-gear clutch, and store the error code in the error storage section 45. Next, step S364 is followed to wait until the key switch 21 turns OFF.

If, on the other hand, the current velocity ratio is not lower than target velocity ratio 1 (high judgment reference value ehigh), step S400 is performed to judge whether the current value of the counter (trial count) has reached a trial limit count. If the current value of the counter has not reached the trial limit count, the above procedure is repeated after adding the value 1 to the value of the counter (initial value=1) (step S402). However, if the current value of the counter has reached the trial limit count, step S414 is followed to judge that trial hydraulic pressure 1 is not successfully determined. Further, step S416 is performed to switch the screen displayed on the monitor 50 to screen 16, which is a monitor error display step 1-2 screen shown in FIG. 18, display error code Ederror000112 to indicate a learning failure in first-gear clutch step 1-2, and store the error code in the error storage section 45. Subsequently, step S364 is followed to wait until the key switch 21 turns OFF.

The learning monitoring process for the step 2 handling process is performed in the same manner as for the step 1 handling process, as described below. The transmission gear shifting control section 46 uses a counter to count the number of trials for trial hydraulic pressure 2 (step S422). When the current velocity ratio is lower than target velocity ratio 2 (low judgment reference value elow), step S430 is performed to judge whether the value of the counter is 1. If the value of the counter is not 1, the prevailing trial hydraulic pressure 2 is stored as the reference clutch hydraulic pressure Pax1 as described earlier. However, if the value of the counter is 1, step S432 is performed to switch the screen displayed on the monitor 50 to screen 17, which is a monitor error display step 2-1 screen shown in FIG. 19, display error code Ederror000121, which indicates a learning failure in step 2-1 for the first-gear clutch, and store the error code in the error storage section 45. Next, step S364 is followed to wait until the key switch 21 turns OFF.

If, on the other hand, the current velocity ratio is not lower than target velocity ratio 2 (low judgment reference value elow), step S420 is performed to judge whether the current value of the counter (trial count) has reached a trial limit count. If the current value of the counter has not reached the trial limit count, the above procedure is repeated after adding the value 1 to the value of the counter (initial value=1) (step S422). However, if the current value of the counter has reached the trial limit count, step S434 is followed to judge that trial hydraulic pressure 2 is not successfully determined. Further, step S436 is performed to switch the screen displayed on the monitor 50 to screen 18, which is a monitor error display step 2-2 screen shown in FIG. 19, display error code Ederror000122 to indicate a learning failure in first-gear clutch step 2-2, and store the error code in the error storage section 45. Subsequently, step S364 is followed to wait until the key switch 21 turns OFF.

The learning monitoring process for the step 3 handling process is performed as described below. As described earlier, the step S3 process is performed to compute learned values by using the reference clutch hydraulic pressures Pax1, Pax2 determined in learning steps 1 and 2 (step S342) and store the computed learned values (clutch hydraulic pressure characteristic values Pa, Pb, Ta, Tb) (step S344). In this learning monitoring process, step S440 is performed after learned value computation to judge whether the learned values are correct. If the learned values are incorrect, step S442 is performed to switch the screen displayed on the monitor 50 to screen 19, which is a monitor error display step 3 screen shown in FIG. 20, display error code Ederror000130 to indicate a learning failure in first-gear clutch step 3, and store the error code in the error storage section 45. Subsequently, step S364 is followed to wait until the key switch 21 turns OFF. Whether the learned values are correct is judged, for instance, by outputting an instruction signal corresponding to a clutch pressure having a hydraulic pressure waveform of the learned values (standby pressure Pa, rapid filling pressure Pb, standby pressure output time Ta, and rapid filling pressure output time Tb) to the solenoid valve 83 to apply the clutch pressure to the first-gear clutch 63 and measuring the resulting velocity ratio. In this instance, the measured velocity ratio is compared, for instance, against an intermediate value between target velocity ratio 1 (high judgment reference value ehigh) and target velocity ratio 2 (low judgment reference value elow). If the measured velocity ratio is within an allowable range of the intermediate value, it is judged that the learned values are correct. If, on the other hand, the measured velocity ratio is outside the allowable range of the intermediate value, it is judged that the learned values are incorrect.

Figure 20:
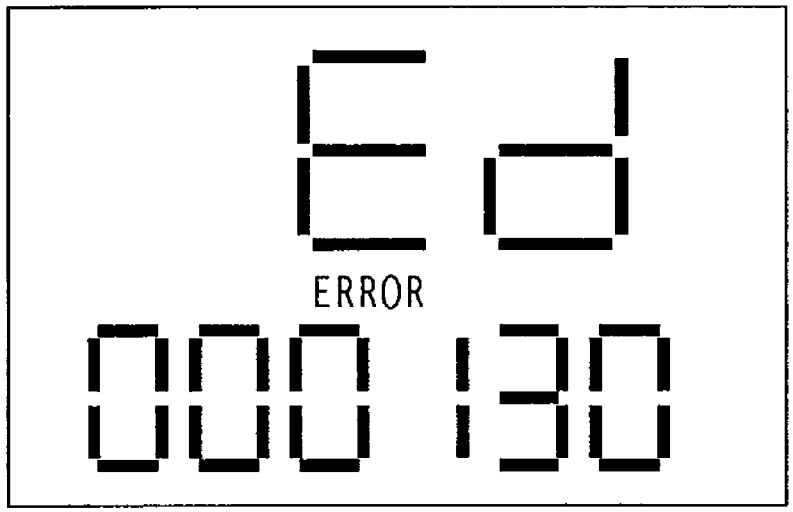
FIG. 20 shows a screen that opens when learning step 3 is not successfully performed for the first-gear clutch during the learning monitoring process, and a screen that opens when learning step 1-1 is not successfully performed for the second-gear clutch.
Figure 20:
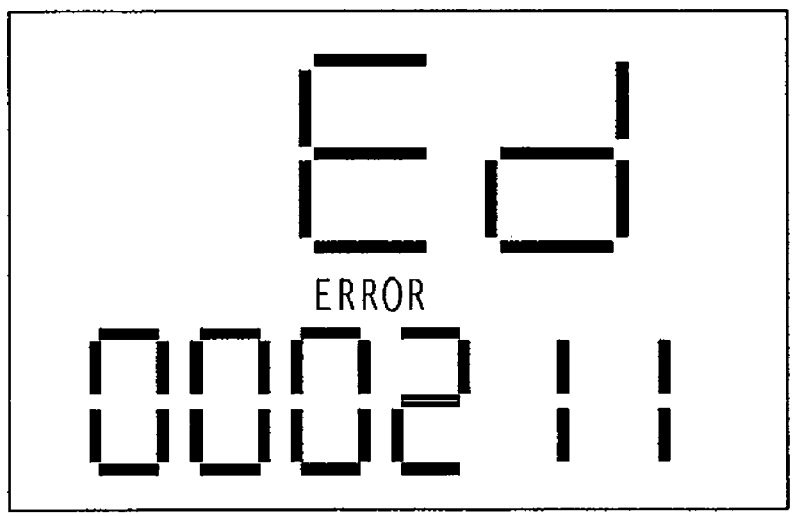

For the learning processes for the second- to fourth-gear clutches 64-66, the same learning monitoring process is performed. When learning fails, the associated error code is displayed on the monitor 50 and stored in the error storage section 45. Screen 20, which is shown in FIG. 20, is a typical screen that opens if a learning failure occurs in second-gear clutch step 1-1. More specifically, if the value of the counter is 1 when the current velocity ratio is found to be lower than target velocity ratio 1 (high judgment reference value ehigh) in a situation where a step 1 learning process is performed for the second-gear clutch 64, error code Ederror000211 is displayed to indicate a learning failure in second-gear clutch step 1-1, and stored in the error storage section 45 (equivalent to steps S306, S410, and S412 shown in FIG. 10).

The processing function (the learning process for the first-gear clutch 63) of the transmission gear shifting control section 46 that is exercised in steps S300 to S344 in the flowcharts shown in FIGS. 10 and 11 and the similar processing function (learning process) for the second-gear clutch 64, third-gear clutch 65, fourth-gear clutch 66, forward travel clutch 61, and reverse travel clutch 62, which is exercised in step S360 of the flowchart shown in FIG. 11, constitute the learning control means. The leaning control means is provided for each of the plurality of clutches 61-65, has a plurality of handling processes (which correspond to similar steps included in steps S300 to S344 in FIGS. 10 and 11 and step S360 in FIG. 11), which each includes a plurality of subprocesses (step 1 in FIG. 10 (steps S300 to S312), step 2 in FIG. 11 (steps S320 to S332), and step 3 in FIG. 11 (steps S340 to S344)), causes each of the plurality of handling processes to learn the clutch hydraulic pressure for the plurality of clutches 61-65, and determines the clutch hydraulic pressure characteristic values for operating the clutches. The processing function of the transmission gear shifting control section 46 that is exercised in steps S400 to S442 in the flowcharts shown in FIGS. 10 and 11 constitutes the learning monitoring means, which formulates an error judgment in each of the plurality of handling processes to judge whether learning has failed in each of the plurality of subprocesses, and displays the result of the judgment.

The processing function of the transmission gear shifting control section 46 that is exercised in steps S200 to S214, which are shown in FIG. 9, constitutes, as another function of the learning monitoring means, the means for monitoring the environment during learning, which formulates an error judgment during learning in the plurality of handling processes to indicate whether the environmental conditions for learning are satisfied, and displays the result of the judgment. The processing function of the transmission gear shifting control section 46 that is exercised in steps S100 to S116, which are shown in FIG. 8, constitutes, as another function of the learning monitoring means, the means for monitoring the environment in advance, which formulates an error judgment before proceeding to the plurality of handling processes to indicate whether the environmental conditions for proceeding to the plurality of handling processes are satisfied, and displays the result of the judgment.

When learning control is initiated, the present embodiment formulates an error judgment and displays the result of the judgment on the monitor 50 as described above. This makes it easy to identify the cause of learning failure. Examples are given below.

<If an Error is Indicated in the Advance Environment Monitoring Process>

If processing does not proceed to a learning process in a situation where error code Er1 (screen 2) or Er2 (screen 4) is displayed before an actual learning process to indicate that the oil temperature or engine rotation speed is not within the predetermined allowable range, as indicated by screen 2, 3, 4, or 5 in FIG. 13 or 14, it is obvious that the learning process could not be initiated because the oil temperature or engine rotation speed, which constitute the environmental conditions for learning process initiation, was not within the predetermined allowable range, and not because the transmission 12 was abnormal during learning processing. Further, error code Er1 (screen 2) and oil temperature (screen 3) or error code Er2 (screen 4) and engine rotation speed (screen 5) alternately appear on the monitor to promptly indicate whether the oil temperature or engine rotation speed is outside the predetermined allowable range. This feature makes it easy to take appropriate corrective measures.

<If an Error is Indicated in the Environment Monitoring Process During Learning>

If a learning process is aborted in a situation where error code Ederror000001, Ederror000002, or Ederror000003 is displayed during the learning process to indicate that the oil temperature or engine rotation speed is outside the predetermined allowable range, as indicated by screen 6, 7, or 8 in FIG. 15, it is obvious that the learning process was aborted because the key switch 21 was turned OFF or the oil temperature or engine rotation speed was outside the predetermined allowable range, and not because the transmission 12 was abnormal during the learning process.

<If an Error is Indicated in the Learning Monitoring Process>

If error code Ederror000111 is displayed to indicate that learning has failed in first-gear clutch step 1-1 as indicated by screen 15 in FIG. 18, it is conceivable that the clutch pressure for trial hydraulic pressure 1 may be too high. In this instance, therefore, it can be estimated that there is a problem with the hydraulic control valve 73, or that the output of the solenoid valve 83 is outside a tolerance range.

If error code Ederror000112 is displayed to indicate that learning has failed in first-gear clutch step 1-2 as indicated by screen 16 in FIG. 18, it is conceivable that the clutch pressure for trial hydraulic pressure 1 may be too low. In this instance, therefore, the actual clutch pressure can be measured to estimate that the output of the hydraulic control valve 73 or solenoid valve 83 is outside a tolerance range, or that there is a problem with the clutch (e.g., a slippery clutch plate).

Figure 19:
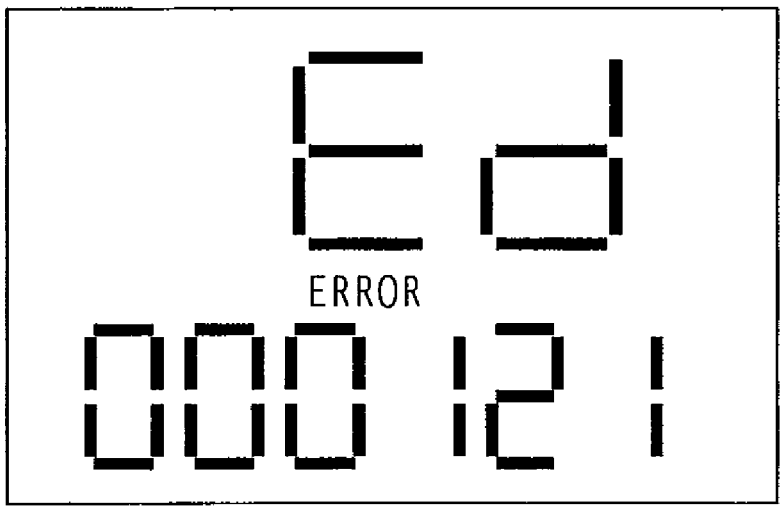
FIG. 19 shows screens that open when learning step 2-1 or 2-2 is not successfully performed for the first-gear clutch during the learning monitoring process.
Figure 19:
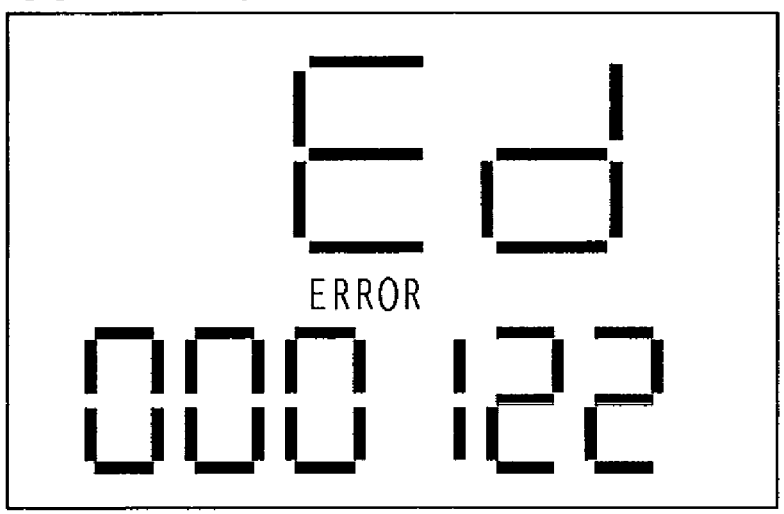

If error code Ederror000121 is displayed to indicate that learning has failed in first-gear clutch step 2-1 as indicated by screen 17 in FIG. 19, it is conceivable that the clutch pressure for trial hydraulic pressure 1 may be too high. In this instance, no abnormality was encountered in step 1-1. Therefore, it can be estimated that the output of the solenoid valve 83 is outside a tolerance range.

If error code Ederror000122 is displayed to indicate that learning has failed in first-gear clutch step 2-2 as indicated by screen 18 in FIG. 19, it is conceivable that the clutch pressure for trial hydraulic pressure 1 may be too low. In this instance, no abnormality was encountered in step 1-2. Therefore, it can be estimated that the output of the solenoid valve 83 is outside a tolerance range.

If error code Ederror000130 is displayed to indicate that learning has failed in first-gear clutch step 3 as indicated by screen 19 in FIG. 20, it is conceivable that the hydraulic control valve 73 or first-gear clutch 63 may be faulty, operate properly in some cases, and operate improperly in some other cases, because no abnormality was encountered in steps 1-1 and 1-2 and no error usually occurs in step 3. For example, a spool for the hydraulic control valve 73 may stick.

The same judgments can also be formulated for the other clutches 64-66, 61 and 62.

When the clutch hydraulic pressures for operating the clutches 61-66 of the transmission 12 are not successfully learned, the present embodiment makes it possible to identify the cause of failure with ease and learn the clutch hydraulic pressures with high efficiency.

Further, the present embodiment uses the monitor 50 to display time and vehicle information such as a vehicle velocity under normal conditions, indicate the progress of learning after learning control is initiated, and display the result of a learning error judgment. Therefore, no additional monitor is necessary for displaying an error judgment. This makes it possible to achieve a system configuration at low cost. Furthermore, the overall flow of learning control can be grasped to exercise learning control with high efficiency because the occurrence of an error is indicated while displaying the progress of learning during learning control.

Moreover, the present embodiment includes the error storage section 45, which stores the results of error judgments that are formulated during the learning monitoring process, and the communication interface 47, which can output the error judgment results stored in the error storage section 45 to the external terminal 48. This makes it possible to deliver the error judgment results to the external terminal 48, allow an external monitor to store the error judgment results of a plurality of work machines (wheel loaders), and display the stored error judgment results on the external monitor for evaluation and assessment purposes. The cause of learning failure related to the plurality of work machines can then be identified with high efficiency.

The embodiment described above assumes that the present invention is applied to learning control over the transmission of a wheel loader that is used as a work machine. However, the present invention can also be applied to learning control over the other transmissions such as those of a telehandler and other machines. Further, the present embodiment assumes that the present invention is applied to a learning processing method of determining the clutch hydraulic pressure characteristic values from the velocity ratio of the torque converter 11. However, the present invention can also be applied to the other learning processing methods that, for instance, determine the clutch hydraulic pressure characteristic values from the turbine rotation speed of the torque converter 11.

The invention claimed is:

1. A gear shifting control device for a work machine having a torque converter and a transmission for transmitting the motive power of an engine to wheels to move the work machine, wherein the transmission has a plurality of clutches and selectively supplies hydraulic oil to the plurality of clutches for gear shifting purposes, the gear shifting control device comprising:

learning control means, which is provided for each of the plurality of clutches and has a plurality of handling processes which are composed of a plurality of subprocesses, for causing each of the plurality of clutches to learn the clutch hydraulic pressure in each of the plurality of handling processes, and determining clutch hydraulic pressure characteristic values for operating each clutch; and learning monitoring means for formulating an error judgment in each of the plurality of handling processes to judge whether learning has failed in each of the plurality of subprocesses and displaying the result of the judgment.

2. The gear shifting control device according to claim 1, wherein the plurality of subprocesses in each of the plurality of handling processes include a first subprocess, which applies a trial hydraulic pressure to each of the plurality of clutches and incrementally raises the applied pressure a number of times to determine a reference clutch pressure at which the velocity ratio of the torque converter decreases to a predetermined judgment value, and a second subprocess, which determines the clutch hydraulic pressure characteristic values in accordance with the reference clutch pressure; and wherein said learning monitoring means monitors the number of times the trial hydraulic pressure is applied in the first subprocess, judges that an error has occurred if the velocity ratio of the torque converter is not decreased to the predetermined judgment value even when a limit is reached by the number of times the trial hydraulic pressure is applied, and displays the error.

3. The gear shifting control device according to claim 2, wherein, in the first subprocess, said learning monitoring means further judges that an error has occurred if the trial hydraulic pressure has been applied once when the velocity ratio of the torque converter is decreased to the predetermined judgment value, and displays the error.

4. The gear shifting control device according to claim 2, wherein, in the second subprocess, said learning monitoring means further applies a clutch pressure to each clutch in accordance with the clutch hydraulic pressure characteristic values, judges that an error has occurred if the resulting velocity ratio is outside an allowable range of the judgment value, and displays the error.

5. The gear shifting control device according to claim 1, wherein said learning monitoring means formulates an error judgment during learning in the plurality of handling processes to judge whether the environmental conditions for learning are satisfied, and displays the result of the judgment.

6. The gear shifting control device according to claim 5, wherein said learning monitoring means monitors the temperature of the hydraulic oil for operating the plurality of clutches and the rotation speed of the engine as the environmental conditions for learning during learning in the plurality of handling processes, judges that an error has occurred if the temperature of the hydraulic oil or the rotation speed of the engine is outside a predetermined allowable range, and displays the error.

7. The gear shifting control device according to claim 1, wherein said learning monitoring means further formulates an error judgment before proceeding to the plurality of handling processes to judge whether the environmental conditions for proceeding to the plurality of handling processes are satisfied, and displays the result of the judgment.

8. The gear shifting control device according to claim 7, wherein, before proceeding to the plurality of handling processes, said learning monitoring means monitors the temperature of the hydraulic oil for operating the plurality of clutches and the rotation speed of the engine as the environmental conditions for proceeding to the plurality of handling processes, judges that an error has occurred if the temperature of the hydraulic oil or the rotation speed of the engine is outside a predetermined allowable range, and displays the error.

9. The gear shifting control device according to claim 1, wherein said learning monitoring means normally causes a monitor, which displays velocity and other vehicle information, to display the progress of learning during learning by said learning control means, and displays the result of an error judgment which is formulated to indicate the occurrence of an error.

10. The gear shifting control device according to claim 1, further comprising:
   storage means for storing the result of an error judgment formulated by said learning monitoring means; and
   communication means for outputting the judgment result stored in the storage means to an external terminal.

* * * * *